United States Patent
Kadowaki et al.

(10) Patent No.: US 9,120,278 B2
(45) Date of Patent: Sep. 1, 2015

(54) METHOD FOR PRODUCING PROGRESSIVE POWER EYEGLASS LENS

(75) Inventors: Shinichiro Kadowaki, Tokyo (JP); Yuji Hoshi, Tokyo (JP); Ken Watanabe, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 1014 days.

(21) Appl. No.: 13/257,613

(22) PCT Filed: Mar. 31, 2010

(86) PCT No.: PCT/JP2010/055861
§ 371 (c)(1),
(2), (4) Date: Sep. 20, 2011

(87) PCT Pub. No.: WO2010/114023
PCT Pub. Date: Oct. 7, 2010

(65) Prior Publication Data
US 2012/0013030 A1 Jan. 19, 2012

(30) Foreign Application Priority Data
Mar. 31, 2009 (JP) .................................. 2009-088043

(51) Int. Cl.
*B29D 11/00* (2006.01)
*B29C 39/00* (2006.01)
(Continued)

(52) U.S. Cl.
CPC ........ *B29D 11/00028* (2013.01); *B29C 39/006* (2013.01); *B29C 39/26* (2013.01); *B29L 2011/0016* (2013.01)

(58) Field of Classification Search
USPC ...................... 264/1.1, 2.5, 2.7, 219; 425/808
IPC ..... B29C 39/006,39/26; B29D 11/00028; B29L 2011/0016
See application file for complete search history.

(56) References Cited

U.S. PATENT DOCUMENTS

| | | | |
|---|---|---|---|
| 3,273,204 A * | 9/1966 | Craddock | 425/394 |
| 5,213,825 A * | 5/1993 | Shimizu et al. | 425/595 |
| 6,913,357 B2 | 7/2005 | Kadowaki | |

FOREIGN PATENT DOCUMENTS

| | | |
|---|---|---|
| CN | 101312920 A | 11/2008 |
| JP | 55 105519 | 8/1980 |

(Continued)

OTHER PUBLICATIONS

Combined Office Action and Search Report issued Jun. 6, 2013 in Chinese Patent Application No. 201080014676.6 with English translation of categories of cited documents.

(Continued)

*Primary Examiner* — Mathieu Vargot
(74) *Attorney, Agent, or Firm* — Oblon, McClelland, Maier & Neustadt, L.L.P.

(57) ABSTRACT

A method for producing a progressive-addition plastic lens having a prism thinning applied thereto without cutting and polishing includes: a lens molding die forming step of forming a lens molding die configured by a first molding die having a molding face for forming one optical surface, which is a progressive-addition surface, of the lens and a second molding die having a molding face for forming the other optical surface of the lens, wherein the first molding die and the second molding die are arranged so that the respective molding faces thereof face inner side; a filling step of filling a lens material liquid containing a monomer composition into the formed lens molding die; and a curing step of polymerizing and curing the filled lens material liquid so as to form the lens. The molding face of the first molding die is formed so that a normal line at a point where the molding face of the first molding die intersects with a reference axis of the first molding die is inclined in the vertical direction with respect to the reference axis of the first molding die.

6 Claims, 12 Drawing Sheets

(51) Int. Cl.
*B29C 39/26* (2006.01)
*B29L 11/00* (2006.01)

(56) References Cited

FOREIGN PATENT DOCUMENTS

| JP | 5 341238 | 12/1993 |
| JP | 2000 88700 | 3/2000 |
| JP | 2000 263567 | 9/2000 |
| JP | 2005 103915 | 4/2005 |
| JP | 2008 137336 | 6/2008 |
| JP | 2008 158494 | 7/2008 |
| WO | 00 62116 | 10/2000 |

OTHER PUBLICATIONS

International Search Report Issued May 11, 2010 in PCT/JP10/055861 filed Mar. 31, 2010.

* cited by examiner

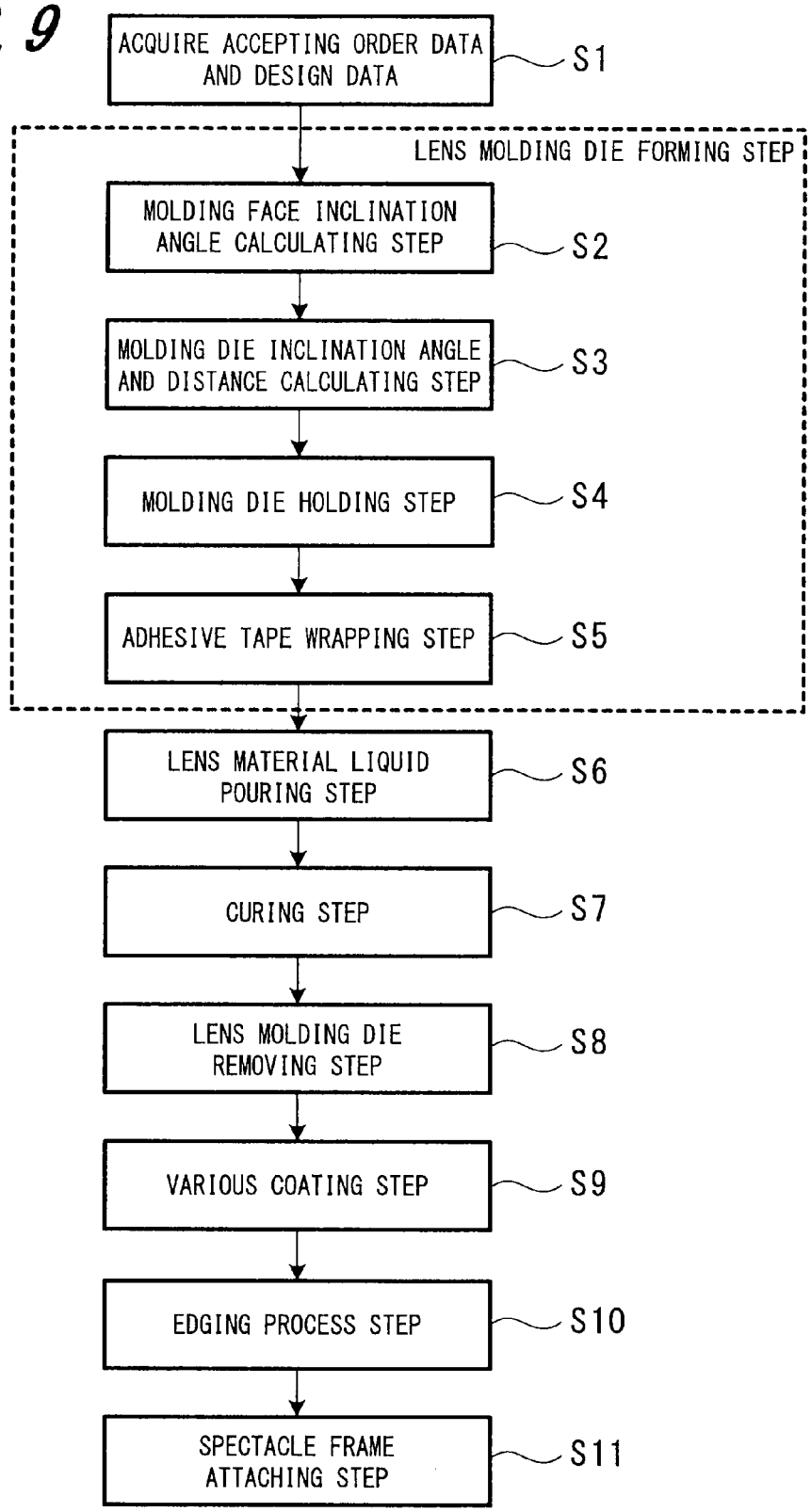

METHOD FOR PRODUCING PROGRESSIVE POWER EYEGLASS LENS

TECHNICAL FIELD

The present invention relates to a method for producing a progressive-addition plastic spectacle lens having a prism thinning applied thereto by a cast polymerization method.

BACKGROUND ART

As spectacle lenses for people whose accommodation is decreased with aging, progressive-addition spectacle lenses (referred to as "progressive lenses" hereinafter), is becoming widely used. Since there are a great variety of types of the progressive lenses designed for different usage environment and intended use of individual wearers of the spectacles, and since it is necessary to provide suitable optical performance for individual wearers according to his/her refractive error and accommodation abnormal, a great number of design conditions (such as the distance-portion power (i.e., the spherical power, the cylindrical power and the cylinder axis), the addition power, the prismatic power, the optical design type, the corridor length, the inset, the center thickness, the edge thickness, the outer diameter, and the like) need to be specified when producing the lenses, so that there will be a tremendous number of combinations of these design conditions.

Thus, it is very difficult to previously prepare all types of finished lenses (i.e., the lenses whose both optical surfaces are optically finished). For this reason, the progressive lens is typically produced on a made-to-order basis after receiving the order from the customer by processing a previously produced lens blank based on individual design conditions. For example, semifinished lens blanks each having an optically finished lens front surface (i.e., convex surface) and an optically unfinished thick lens back surface (i.e., concave surface) are previously prepared and stocked (wherein the optically finished lens front surface is a progressive-addition surface), and a most suitable semifinished lens is selected from these semifinished lens blanks according to the order of the customer. Thereafter, the back surface of the selected semifinished lens is optically finished by being cut with a cutting machine (i.e., a curve generator) and polished with a polishing machine according to the order details of the customer, and thereby a progressive lens with desired optical performance is produced (see, for example, Patent document 1).

Further, in order to reduce the thickness and weight of the progressive lens, a prism thinning process is conventionally performed to cut the back surfaces of a pair of left and right semifinished lenses so that an identical prism having vertical base direction is added to both the left and right lenses (see, for example, Patent document 2).

Furthermore, as one of methods for producing the semifinished lens blank, a cast polymerization method employing a tape molding method has been conventionally used. In such cast polymerization method, two molding dies for forming the front surface and the back surface of the lens are held at a predetermined distance from each other, an adhesive tape is wrapped around the two molding dies so as to form a lens molding die, a kind of plastic lens material liquid is poured into the lens molding die, and the plastic lens material liquid is polymerized and cured to form a lens (see, for example, Patent document 3).

PRIOR ART DOCUMENTS

Prior Art Documents

[Patent document 1] International publication No. WO00/62116

[Patent document 2] Japanese Patent Publication No. H05-341238

[Patent document 3] Japanese Patent Publication No. S55-105519

DISCLOSURE OF THE INVENTION

Problems to be Solved by the Invention

However, in the case where the progressive-addition lens is produced by cutting and polishing the lens blank as described above, since it is necessary to satisfy various order details with less kinds of lens blanks, the unfinished surface of the lens blank has to be made thick, and therefore the lens blanks with large volume have to be mass-produced in stock. Thus, more lens material liquid needs to be used compared with the lens material liquid necessary for producing the finally completed lens, and therefore the production cost will be increased accordingly.

As a method for improving the utilization of the lens material liquid, there is a proposal to employ a cast polymerization method to form a finished lens satisfying the order details, or a lens blank with small cutting margin and polishing margin set based on the order details. However, as described above, since there are a large variety of design conditions for each order, a great number of kinds of molding dies have to be prepared to satisfy various order details, and therefore production cost will be high, and management will be complicated. Further, if trying to use such method to form the aforesaid finished lens having a prism thinning applied thereto, further larger number of kinds of molding dies have to be prepared, and therefore such method is unlikely to be used.

To solve the above problems, an object of the present invention is to provide a method for producing a progressive plastic lens having a prism thinning applied thereto in a manner that allows to satisfy a great number of design values with less kinds of molding dies and improve the utilization of the lens material liquid.

Means for Solving the Problems

As a result of a dedicated study, the inventor of the present invention has focuses his (or her) attention on forming a lens molding die in which two molding dies are held so that one molding die for forming one surface is inclined with respect to the other molding die for forming the other surface. In the conventional tape molding method, the molding die for forming the front surface and the molding die for forming the back surface have the same diameter, and the both molding dies are arranged opposite each other so that the respective circumferential surfaces thereof are located on the same cylindrical surface. Thus, in the conventional tape molding method, if one molding die is inclined, the sealing performance between the adhesive tape and the inclined molding die will be insufficient, so that there are concerns that, during curing process of the filled lens material liquid, the lens material liquid might be leaked out, air might be drawn into the lens molding die, and wrinkles might be generated between the adhesive tape and the both molding dies, so that the shrinkage caused during curing will be uneven to therefore cause undesired leaning of the lens thickness. The present invention has been made in view of the above problems, and has following characteristics.

A method for producing a progressive-addition spectacle lens according to a first aspect of the present invention is a method for producing a progressive-addition spectacle lens having a prism thinning applied thereto. The method comprises: a lens molding die forming step of forming a lens molding die configured by a first molding die having a molding face for forming one optical surface, which is a progressive-addition surface, of the lens and a second molding die having a molding face for forming the other optical surface of the lens, wherein the first molding die and the second molding die are arranged so that the respective molding faces thereof face inner side; a filling step of filling a lens material liquid containing a monomer composition into the formed lens molding die; and a curing step of polymerizing and curing the filled lens material liquid so as to form the lens, wherein the molding face of the first molding die is formed so that a normal line at a point where the molding face of the first molding die intersects with a reference axis of the first molding die is inclined in the vertical direction with respect to the reference axis of the first molding die, and wherein the lens molding die forming step comprises: a molding die holding step of holding the both molding die so that the reference axis of the first molding die is inclined in the vertical direction with respect to a reference axis of the second molding die; and an adhesive tape wrapping step of wrapping an adhesive tape around circumferential surfaces of the both molding dies held in the molding die holding step with the adhesive face of the adhesive tape facing inward.

A method for producing the progressive-addition spectacle lens a second aspect of the present invention is characterized in that, in the first aspect of the present invention, the lens molding die forming step comprises a molding face inclination angle calculating step of calculating a molding face inclination angle in the vertical direction between the both optical surfaces, the molding face inclination angle being formed for reducing the edge thickness of the lens shape after edging, and a molding die inclination angle calculating step of calculating a molding die inclination angle of the first molding die with respect to the second molding die in the molding die holding step based on the difference between the molding face inclination angle obtained in the molding face inclination angle calculating step and the a first molding die molding face inclination angle with respect to the first molding die, and wherein the molding die holding step inclines the first molding die with respect to the second molding die according to the molding die inclination angle obtained in the molding die inclination angle calculating step and holds the molding dies.

A method for producing the progressive-addition spectacle lens according to a third aspect of the present invention is characterized in that, in the first or second aspect of the present invention, the circumferential surfaces of the both molding dies are cylindrical surfaces respectively substantially parallel to the reference axes of the respective molding dies, and the adhesive tape wrapping step stretches the adhesive tape and attaches the adhesive face of the adhesive tape to the circumferential surfaces of the both molding dies.

A method for producing the progressive-addition spectacle lens according to a fourth aspect of the present invention is characterized in that, in the third aspect of the present invention, the adhesive tape wrapping step wraps the adhesive tape with the reference axis of either molding die as a rotation axis.

A method for producing the progressive-addition spectacle lens according to a fifth aspect of the present invention is characterized in that, in any one the first to fourth aspects of the present invention, in the molding die holding step, the second molding die is held so that the rotational position with the reference axis thereof as the center is adjustable, and the first molding die is held so that the inclination angle of the reference axis thereof in the vertical direction is adjustable.

A method for producing the progressive-addition spectacle lens according to a sixth aspect of the present invention is characterized in that, in any one the first to fifth aspects of the present invention, the holding force of the adhesive tape is set so that during the polymerization and cure in the curing step, the adhesive face of the adhesive tape peels off from at least one of the both lens molding dies.

A method for producing the progressive-addition spectacle lens according to a seventh aspect of the present invention is characterized in that, in the sixth aspect of the present invention, the holding force of the adhesive tape is in a range of 5 to 30 minutes.

Advantages of the Invention

According to the present invention, by adjusting the inclination of one molding die with respect to the other molding die according to the design values, it is possible to form different progressive-addition plastic spectacle lenses having different prism thinning applied thereto with the same pair of molding dies. Thus, it is possible to produce different progressive-addition plastic lenses with various design values with less kinds of molding dies, and it is possible to improve the utilization of the lens material liquid.

BRIEF DESCRIPTION OF DRAWINGS

FIG. 9 is a flowchart for explaining the production method of the progressive-addition plastic lens according to the embodiment of the present invention;

BEST MODES FOR CARRYING OUT THE INVENTION

Before describing a concrete embodiment of the present invention, a conventional method for producing a semifinished plastic lens having no prism thinning applied thereto by a cast polymerization method using a lens molding die formed by a tape molding method will be described below first, wherein the semifinished plastic lens has one surface thereof formed as a progressive-addition surface and the other surface thereof formed as a spherical surface.

Figure 1A:
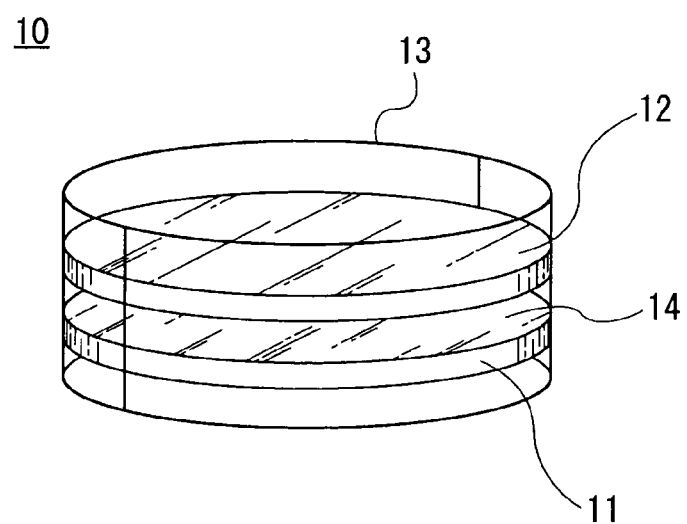
FIG. 1A is a perspective view showing a lens molding die used in a conventional method for producing a lens blank.
Figure 1B:
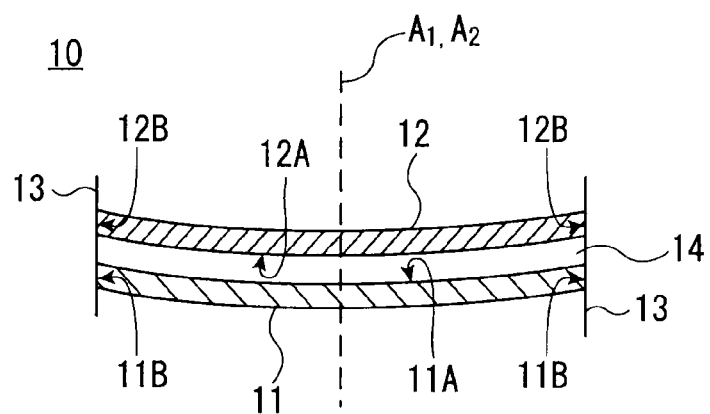
FIG. 1B is a cross section of the same lens molding die.

FIG. 1A is a perspective view showing a lens molding die 10. FIG. 1B is cross section of the lens molding die 10. As shown in FIGS. 1A and 1B, the lens molding die 10 includes a molding die 11 for forming the lens front surface (referred to as a "front surface molding die" hereinafter), a molding die 12 for forming the lens back surface (referred to as a "back surface molding die" hereinafter), and an adhesive tape 13 wrapped around the circumferential portions of the front surface molding die 11 and the back surface molding die 12.

The front surface molding die 11 and the back surface molding die 12 are both made of glass, and are both formed in circular lens-like shapes of the same diameter as seen in front view. A concave molding face 11A (referred to as a "front surface molding face" hereinafter) for transcribing the lens front surface is formed in one face of the front surface molding die 11, and a convex spherical surface is formed in the other face (i.e., a non-molding face) of the front surface molding die 11. Further, a convex molding face 12A (referred to as a "back surface molding face" hereinafter) for transcribing the lens back surface is formed in one face of the back surface molding die 12, and a concave spherical surface is formed in the other face (i.e., a non-molding face) of the back surface molding die 12. The front surface molding face 11A has a surface shape for forming the lens front surface, which is a progressive-addition surface, and back surface molding face 12A has a surface shape for forming the lens back surface, which is a spherical surface. A circumferential surface 11B of the front surface molding die and a circumferential surface 12B of the back surface molding die 12 are each a cylindrical surface or a slightly inclined conical surface. Here, the central axis of the circumferential surface 11B is regarded as a reference axis $A_1$ of the front surface molding die 11, and the central axis of the circumferential surface 12B is regarded as a reference axis $A_2$ of the back surface molding die 12. Incidentally, the description below is made based on a case where the circumferential surfaces 11B, 12B are each a cylindrical surface.

The front surface molding face 11A is formed in the front surface molding die 11 so that the reference axis $A_1$ of the front surface molding die 11 is aligned with the normal line at a point where the reference axis $A_1$ intersects with the front surface molding face 11A (such point is also referred to as a "front surface molding face reference point" hereinafter).

Further, the back surface molding face 12A is formed in the back surface molding die 12 so that the reference axis $A_2$ of the back surface molding die 12 is aligned with the normal line at a point where the reference axis $A_2$ intersects with the back surface molding face 12A (such point is also referred to as a "back surface molding face reference point" hereinafter).

The adhesive tape 13 is a band-like plastic film, and an adhesive agent layer is formed on one surface of the adhesive tape 13.

In the lens molding die 10, the front surface molding die 11 and the back surface molding die 12 are arranged so that the front surface molding face 11A of the front surface molding die 11 and the back surface molding face 12A of the back surface molding die 12 oppose each other with a predetermined distance therebetween in a state where the reference axis $A_1$ of the front surface molding die 11 and the reference axis $A_2$ of the back surface molding die 12 are aligned with each other. Further, the adhesive tape 13 is attached by being wrapped around the circumferential surface 11B of the front surface molding die 11 and the circumferential surface 12B of the back surface molding die 12 by slightly more than one turn with the adhesive agent layer side facing inward. Due to the provision of the adhesive tape 13, the position of the front surface molding die 11 and the position of back surface molding die 12 are fixed. Thus, a gap is formed between the front surface molding die 11 and the back surface molding die 12, so that a blocked cavity 14 defined by the front surface molding face 11A of the front surface molding die 11, the back surface molding face 12A of the back surface molding die 12, and the inner face of the adhesive tape 13 is formed.

Figure 2:
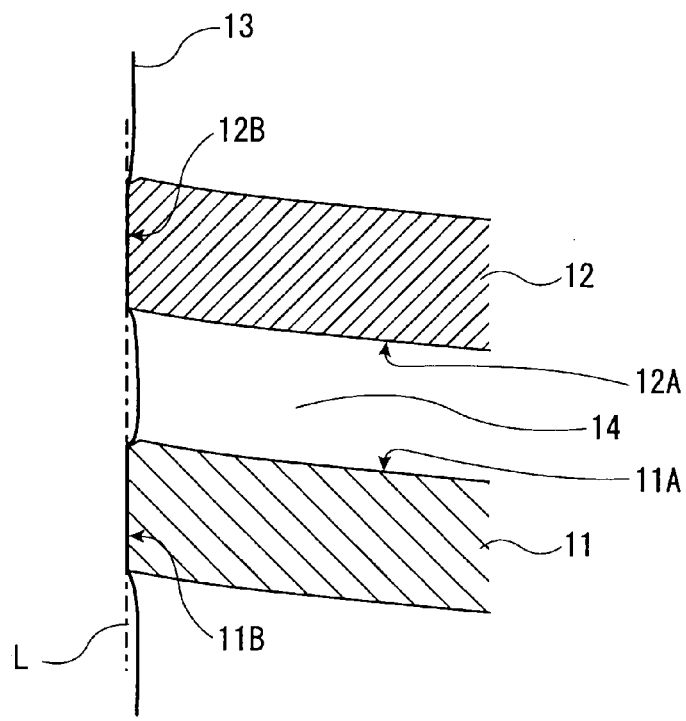
FIG. 2 is an enlarged view showing the vicinity of an adhesive tape of the lens molding die shown in FIGS. 1A and 1B.

FIG. 2 is an enlarged view showing the vicinity of the adhesive tape 13 in the cross section of the lens molding die shown in FIG. 1B. As described above, since the front surface molding die 11 and the back surface molding die 12 have the same diameter and are arranged so that the reference axes $A_1$ of the front surface molding die 11 and the reference axis $A_2$ of the back surface molding die 12 are aligned with each other, the circumferential surface 11B of the front surface molding die 11 and the back surface molding face 12A of the back surface molding die 12 are located on the same cylindrical surface, and therefore the cross section of the circumferential surface 11B and the cross section of the circumferential surface 12B lie in the same line L as shown in FIG. 2.

Further, as shown in FIG. 2, since the adhesive tape 13 is wrapped while being tensioned, the adhesive tape 13 is deflected toward the center direction except for the portion adhering to the circumferential surface 11B of the front surface molding die 11 and the portion adhering to the circumferential surface 12B of the back surface molding die 12.

A kind of plastic lens material liquid containing a monomer composition (which is a thermosetting polymerization component) is poured into the cavity 14 of the lens molding die 10 configured in the aforesaid manner.

For example, the lens material liquid may be poured into the lens molding die 10 by, for example, a method of: peeling off a part of the adhesive tape 13 to form an inlet opening into the cavity 14, and pouring the lens material liquid into the cavity 14 from the inlet. The pouring of the lens material liquid is stopped as the lens material liquid has filled the cavity 14 and reached the inlet, and then the inlet is wrapped again by the adhesive tape 13.

The lens molding die 10 filled with the lens material liquid is put into a polymerization oven where the monomer composition is polymerized and cured at a predetermined temperature. Further, after polymerization has been completed, the lens molding die 10 is taken out from the polymerization oven and cooled, and then the adhesive tape 13, the front surface molding die 11 and the back surface molding die 12 are removed to obtain a lens blank. By the aforesaid method, the semifinished lens blank is produced.

In the semifinished lens blank whose front surface is a progressive-addition surface formed in the aforesaid manner, the back surface is formed thick, and a progressive lens meeting the individual order details is produced by cutting and polishing the back surface so as to obtain desired optical performance (the distance-portion power (i.e., the spherical power, the cylindrical power, and the cylinder axis) and the addition power) according to the prescription data of the customer. Further, it is also possible to perform a prism thinning process when cutting the back surface so as to reduce thickness and weight of the lens.

Next, a method for producing a progressive-addition plastic lens by a cast polymerization method according to an embodiment of the present invention will be described below, wherein the progressive-addition plastic lens is a finished lens to which a prism thinning has been applied. Incidentally, the present embodiment is described based on a case where there is no prescription prism.

Figure 3:
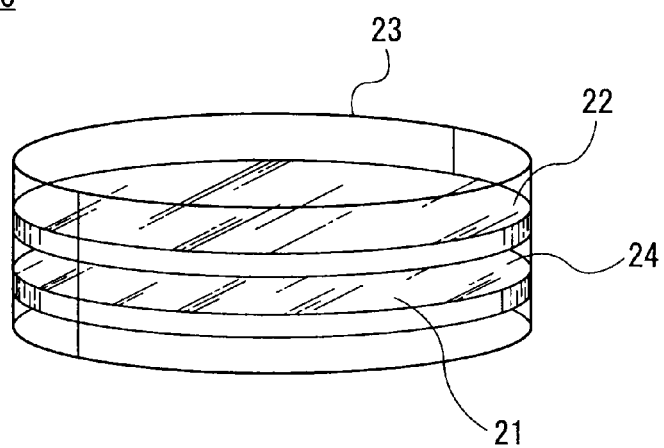
FIG. 3 is a perspective view showing a lens molding die associated with a method for producing a progressive-addition plastic lens according to an embodiment of the present invention.
Figure 4A:
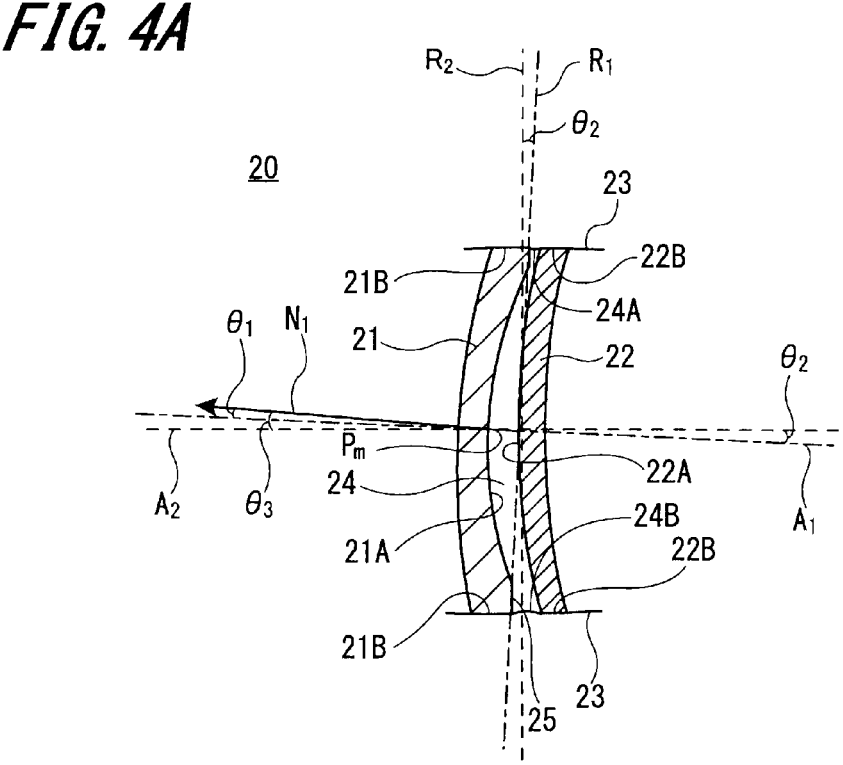
FIG. 4A is a cross section showing a vertical direction passing through a point corresponding to a prism measuring position of the lens molding die shown in FIG. 3.
Figure 4B:
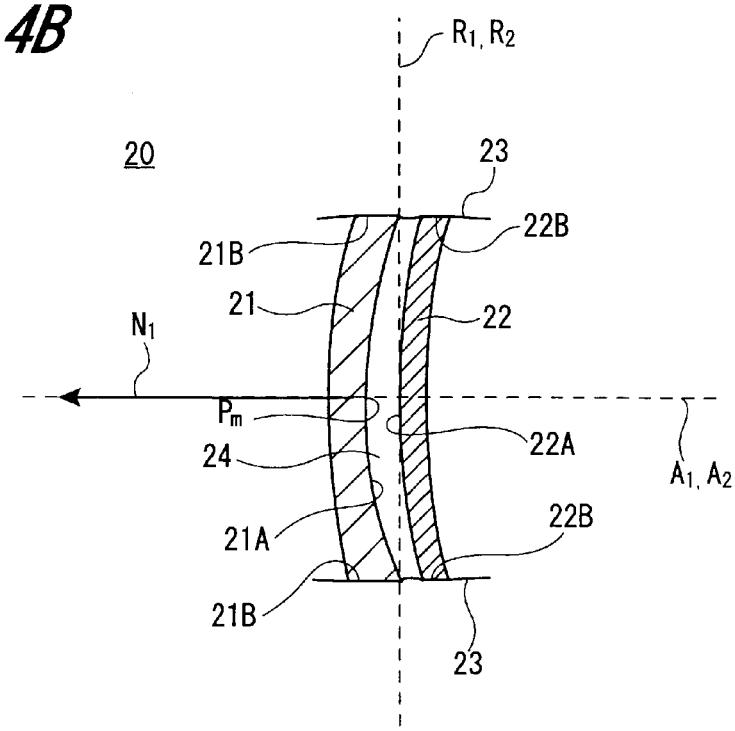
FIG. 4B is a cross section showing a horizontal direction passing through the point corresponding to the prism measuring position of the lens molding die shown in FIG. 3.

FIG. 3 is a perspective view showing a lens molding die 20 associated with a method for producing a progressive lens according to the embodiment of the present invention, and FIGS. 4A and 4B are cross sections of the lens molding die 20. FIG. 4A is a cross section showing a vertical direction passing through a point corresponding to the geometrical center of the progressive lens formed by the lens molding die 20. FIG. 4B is a cross section showing a horizontal direction passing through the point corresponding to the geometrical center of the progressive lens formed by the lens molding die 20.

Incidentally, in the description of the present invention, the term "vertical direction" used for describing the molding dies (i.e., the lens molding dies 10, 20, the front surface molding die 11, the back surface molding die 12, a first molding die 21, and a second molding die 22) and the molding faces (i.e., the front surface molding face 11A, the back surface molding face 12A, a first molding face 21A, and a second molding face 22A) means the vertical direction (i.e., the up-down direction) of the progressive-addition lens to be formed, and the term "horizontal direction" means the horizontal direction (i.e., the left-right direction) of the progressive-addition lens to be formed.

As shown in the drawings, the lens molding die 20 for producing the progressive-addition plastic lens includes a first molding die 21 for forming one optical surface (which is a progressive-addition surface), a second molding die 22 for forming the other optical surface, and an adhesive tape 23 wrapped around the circumferential portions of the molding dies 21, 22. The present embodiment is described based on a case where a finished lens (i.e., a lens whose both surfaces are optically finished) is produced, wherein the front surface (the convex surface) of the finished lens is a progressive-addition surface, and the back surface (the concave surface) of the finished lens is one of a spherical surface, an aspherical surface, a toroidal surface, and an atoroidal surface. Thus, in the present embodiment, the molding die for forming the lens front surface (i.e., the front surface molding die) is the first molding die 21, and the molding die for forming the lens back surface (i.e., the back surface molding die) is the second molding die 22.

The first molding die 21 and the second molding die 22 are both made of glass, and are both formed in circular lens-like shapes of the same diameter as seen in front view. A concave molding face 21A (referred to as a "first molding face" hereinafter) for transcribing the lens front surface is formed in one face of the first molding die 21, and a convex spherical surface is formed in the other face (i.e., a non-molding face) of the first molding die 21. A convex molding face 22A (referred to as a "second molding face" hereinafter) for transcribing the lens back surface is formed in one face of the second molding die 22, and a convex spherical surface is formed in the other face (i.e., a non-molding face) of the second molding die 22. The first molding face 21A has a surface shape for forming the lens front surface which is a progressive-addition surface, and second molding face 22A has a surface shape for forming the lens back surface which is any one a spherical surface, a rotationally symmetric aspherical surface, a toroidal surface, and an atoroidal surface. A circumferential surface 21B (also referred to as a "first circumferential surface" hereinafter) of the first molding die 21 and a circumferential surface 22B (also referred to as a "second circumferential surface" hereinafter) of the second molding die 22 are each a cylindrical surface or a slightly inclined conical surface. Here, the central axis of the circumferential surface 21B is regarded as a reference axis $A_1$ of the first molding die 21 (also referred to as a "first reference axis" hereinafter), and the central axis of the circumferential surface 22B is regarded as a reference axis $A_2$ of the second molding die 12 (also referred to as a "second reference axis" hereinafter).

Further, a reference surface 25 is formed in the edge of the first molding face 21A of the first molding die 21, wherein the reference surface 25 is defined by a plane $R_1$ perpendicular to the first reference axis $A_1$. Incidentally, the description below is made based on a case where the circumferential surfaces 21B, 22B are each a cylindrical surface.

The first molding face 21A is formed in the first molding die 21 so that the normal line at a point where the reference axis $A_1$ of the first molding die 21 intersects with the first molding face 21A (such point is also referred to as a "first molding face reference point" hereinafter) obliquely intersects with the reference axis $A_1$ in the vertical direction. An inclination angle $\theta_1$ of the first molding face 21A of the first molding die 21A (i.e., the angle between the normal line $N_1$ and the reference axis $A_1$; also referred to as a "first molding face inclination angle" hereinafter) is set based on an inclination angle which enables to obtain a prism thinning (also referred to as a "uncut prism thinning" hereinafter) for optimizing the thickness of the left and right lenses prior to edging (i.e., the left and right uncut lenses).

Further, the second molding face 22A is formed in the second molding die 22 so that the reference axis $A_2$ of the second molding die 22 is aligned with the normal line at a point where the reference axis $A_2$ intersects with the second molding face 22A (such point is also referred to as a "second molding face reference point" hereinafter). Incidentally, in the case where the second molding face 22A is a toroidal surface or an atoroidal surface, the intersection of the two principal meridians is located in the second reference axis $A_2$; while in the case where the second molding face 22A is a rotationally symmetric aspherical surface, the rotationally symmetric axis of the rotationally symmetric aspherical surface is aligned with the second reference axis $A_2$.

The adhesive tape 23 is a band-like plastic film, and an adhesive agent layer is formed on one surface of the adhesive tape 23. The adhesive tape 23 will be described later in more detail.

In the lens molding die 20, the first molding die 21 and the second molding die 22 are arranged so that the first molding face 21A and the second molding face 22A oppose each other with a predetermined distance therebetween in a state where the first reference axis $A_1$ obliquely intersects with the second reference axis $A_2$ in the vertical direction. A relative inclination angle $\theta_2$ between the first molding die 21 and the second molding die 22 (i.e., the angle between the reference axis $A_1$ and the reference axis $A_2$; also referred to as a "molding die inclination angle" hereinafter) is set based on a value obtained by subtracting the first molding face inclination angle $\theta_1$ from a relative inclination angle $\theta_3$ between the both molding face 21A, 22B (i.e., the angle between the normal line $N_1$ and the reference axis $A_2$; also referred to as a "molding face inclination angle" hereinafter), wherein the relative inclination angle $\theta_3$ enables to obtain a prism thinning (also referred to as an "edged prism thinning" hereinafter) for optimizing the thickness of the left and right lenses after edging (i.e., the left and right edged lenses). Incidentally, since the inclination angle of the reference surface 25 with respect to a plane $R_2$ perpendicular to the second reference axis $A_2$ is equal to the molding die inclination angle $\theta_2$, the reference surface 25 may also be regarded as the reference when setting the relative inclination angle between the first molding die 21 and the second molding die 22.

The position of the first molding die 21 with respect to the second molding die 22 in the direction perpendicular to the second reference axis $A_2$ is set so that the position of the geometrical center of the outline of the first molding die 22 (the position of the intersection between the vertical centerline and the horizontal centerline of the outline of the first molding die 21) viewed from the direction of the second reference axis $A_2$ is located in the second reference axis $A_2$. In other words, as shown in FIGS. 4A and 4B, in the case where the first molding die 21 is inclined in the vertical direction with respect to the second molding die 22 so that the distance therebetween on the upper side becomes small, the upper end of the vertical centerline of the outline of the first molding die 21 when viewed from the direction of the second reference axis $A_2$ is the corner between the non-molding face of the first molding die 21 and the circumferential surface 21B, and the lower end of the vertical centerline of the outline of the first molding die 21 when viewed from the direction of the second reference axis $A_2$ is the corner between the reference surface 25 and the circumferential surface 21B. The central position between the upper end and the lower end in the vertical centerline is located in the second reference axis $A_2$.

Incidentally, the prism thinning and the base direction (vertical) thereof need to be set the same between the left lens and the right lens. In the cases where there is no prescription prism, like in the case of the present embodiment, the molding face inclination angle $\theta_3$ of the lens molding die for the left lens and the right lens is individually set so that the prismatic power at the prism measuring reference point and the base direction (vertical) of the prismatic power of the left lens to be formed are equal to those of the right lens to be formed. The distance between the first molding die and the second molding die 22 in the direction of the second reference axis $A_2$ is set so that the thickness of the lens to be formed (i.e., the thickness in the direction of the normal line at the prism measuring reference point) becomes a predetermined value.

In a state where the relative position and direction between the first molding die 21 and the second molding die 22 are kept in the aforesaid manner, the adhesive tape 23 is attached by being wrapped around the circumferential surface 21B of the first molding die 21 and the circumferential surface 22B of the second molding die 22 by slightly more than one turn with the adhesive agent layer side facing inward. Due to the provision of the adhesive tape 23, the position of the first molding die 21 and the position of the second molding die 22 are fixed. Thus, a gap is formed between the first molding die 21 and the second molding die 22, so that a blocked cavity 24 defined by the molding face 21A of the first molding die 21, the molding face 22A of the second molding die 22, and the inner face of the adhesive tape 23 is formed.

As shown in FIG. 4A, in the vertical direction, the distance between the first molding face 21A and the second molding face 22A of the lens molding die 20 formed in the aforesaid manner is small on the upper end and large on the lower end.

Further, as shown in FIG. 4B, in the cross section of the lens molding die 20 in the horizontal direction, the distance between the first molding face 21A and the second molding face 22A on the left end is substantially equal to that on the right end.

In the present embodiment, the prism thinning is applied to the progressive-addition plastic lens formed by the lens molding die 20 by controlling the relative position and relative inclination angle between the first molding die 21 and the second molding die 22 disposed opposite to each other. As described above, since the first molding face 21A is previously inclined in the vertical direction with respect to the first molding die 21, by inclining the first molding die in the vertical direction with respect to the second molding die 22, the summed angle of the first molding face inclination angle $\theta_1$ and the molding die inclination angle $\theta_2$ is equal to the inclination angle (the molding face inclination angle) $\theta_3$ of the first molding face 21A with respect to the second molding face 22A. Further, in a state where the both molding dies 21, 22 are inclined to each other at the molding die inclination angle $\theta_2$, the positions of the both molding dies 21, 22 and the distance therebetween are fixed by the adhesive tape 23, and thereby a molding die capable of setting the prism thinning for the lens to be formed is configured.

As described above, in the present embodiment, since the first molding face inclination angle $\theta_1$ is set based on the inclination angle for optimizing the thickness (particularly the edge thickness) of the left and right lenses prior to edging, the molding face inclination angle $\theta_3$ for optimizing the thickness (particularly the edge thickness) of the left and right lenses after edging can be set by setting the molding die inclination angle $\theta_2$, so that the control of the prism thinning becomes easy. In other words, when forming a lens having an uncut prism thinning applied thereto, the molding die inclination angle $\theta_2$ is set to zero degree; while when forming a lens having an edged prism thinning applied thereto, the molding die inclination angle $\theta_2$ is set to a value which is obtained by subtracting the first molding face inclination angle $\theta_1$ from the molding face inclination angle $\theta_3$, which is the target. Further, by providing the first molding face inclination angle $\theta_1$, setting range of the molding die inclination angle $\theta_2$ can be reduced, and therefore adhesion (which is to be discussed later) of the adhesive tape can be easily controlled.

The molding die inclination angle $\theta_2$ is set according to the design values of progressive-addition multifocal plastic lens to be produced; however, it is preferred that the molding die inclination angle $\theta_2$ is set in a range between 0.01 degree and 3 degree, preferably in a range between 0.01 degree and 1 degree. When the molding die inclination angle $\theta_2$ is equal to or larger than 0.01 degree, an effective prism thinning can be formed to the progressive-addition plastic lens; while when the molding die inclination angle $\theta_2$ is equal to or smaller than 3 degree, since good adhesion and fixedness of the adhesive tape 23 can be obtained when fixing the both molding dies 21, 22 with the adhesive tape 23, the lens material liquid poured into the cavity 24 will be unlikely to leak out.

Figure 5:
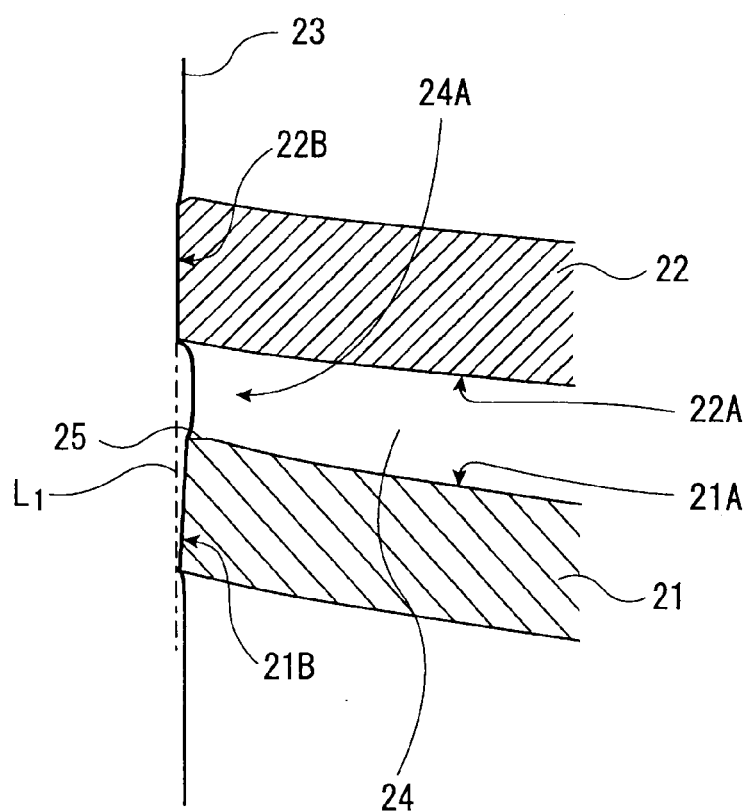
FIG. 5 is an enlarged view showing the vicinity of the upper end of the cross section of the lens molding die shown in FIG. 4A.

FIG. 5 is an enlarged view showing a vicinity 24A of the upper side of the adhesive tape 23 in the cross section in the vertical direction of the lens molding die 20 shown in FIG. 4A.

As shown in FIG. 5, in the lens molding die 20, since the first molding die 21 and the second molding die 22 are disposed facing each other so as be to inclined to each other, the circumferential surface 21B of the first molding die 21 is not located in an extension of the circumferential surface 22B of the second molding die 22. In other words, the cross section of the circumferential surface 21B of the first molding die 21 and the cross section of the circumferential surface 22B of the second molding die 22 are not in the same line, and the circumferential surface 21B of the first molding die 21 is inclined with respect to the circumferential surface 22B of the second molding die 22.

Further, as shown in FIG. 5, since the adhesive tape 23 is wrapped while being tensioned, the adhesive tape 23 is deflected toward the center direction except for the portion adhering to the circumferential surface 21B of the first molding die 21 and the portion adhering to the circumferential surface 22B of the second molding die 22.

Incidentally, since the present embodiment is a case where there is no prescription prism, the base direction of the prismatic power is the vertical direction, and therefore the first molding face inclination angle $\theta_1$, the molding die inclination angle $\theta_2$, and the molding face inclination angle $\theta_3$ are set as the angles in the vertical plane passing through the second reference axis $A_2$ of the lens molding die 20; however, in the case where there is prescription prism, the first molding face inclination angle $\theta_1$, the molding die inclination angle $\theta_2$, and the molding face inclination angle $\theta_3$ may be set as angles in a plane passing through the second reference axis $A_2$ and located in the base direction of a prism obtained by combining the prescription prism and the edged prism thinning (the prism obtained by combining the prescription prism and the edged prism thinning is also referred to as a "combined edged prism" hereinafter). In such a case, the first molding face inclination angle $\theta_1$ is set with respect to the first molding die 21 as an angle in a plane in the base direction of the combined edged prism passing through the first reference axis $A_1$; the molding die inclination angle $\theta_2$ is an angle obtained by subtracting the first molding face inclination angle $\theta_1$ from the relative inclination angle $\theta_3$ between the both molding faces 21A, 22B, from which the combined edged prism is obtained, and is as an angle in a plane passing through the second reference axis $A_2$ and located in the base direction of the combined edged prism. Hereinafter, the direction in which the first molding face inclination angle $\theta_1$, the molding die inclination angle $\theta_2$, and the molding face inclination angle $\theta_3$ are set is also simply referred to as a "inclination direction".

Next, a production method of the progressive-addition plastic lens by using the aforesaid lens molding die 20 and a production method of the spectacles including the lens will be described below.

Figure 11:
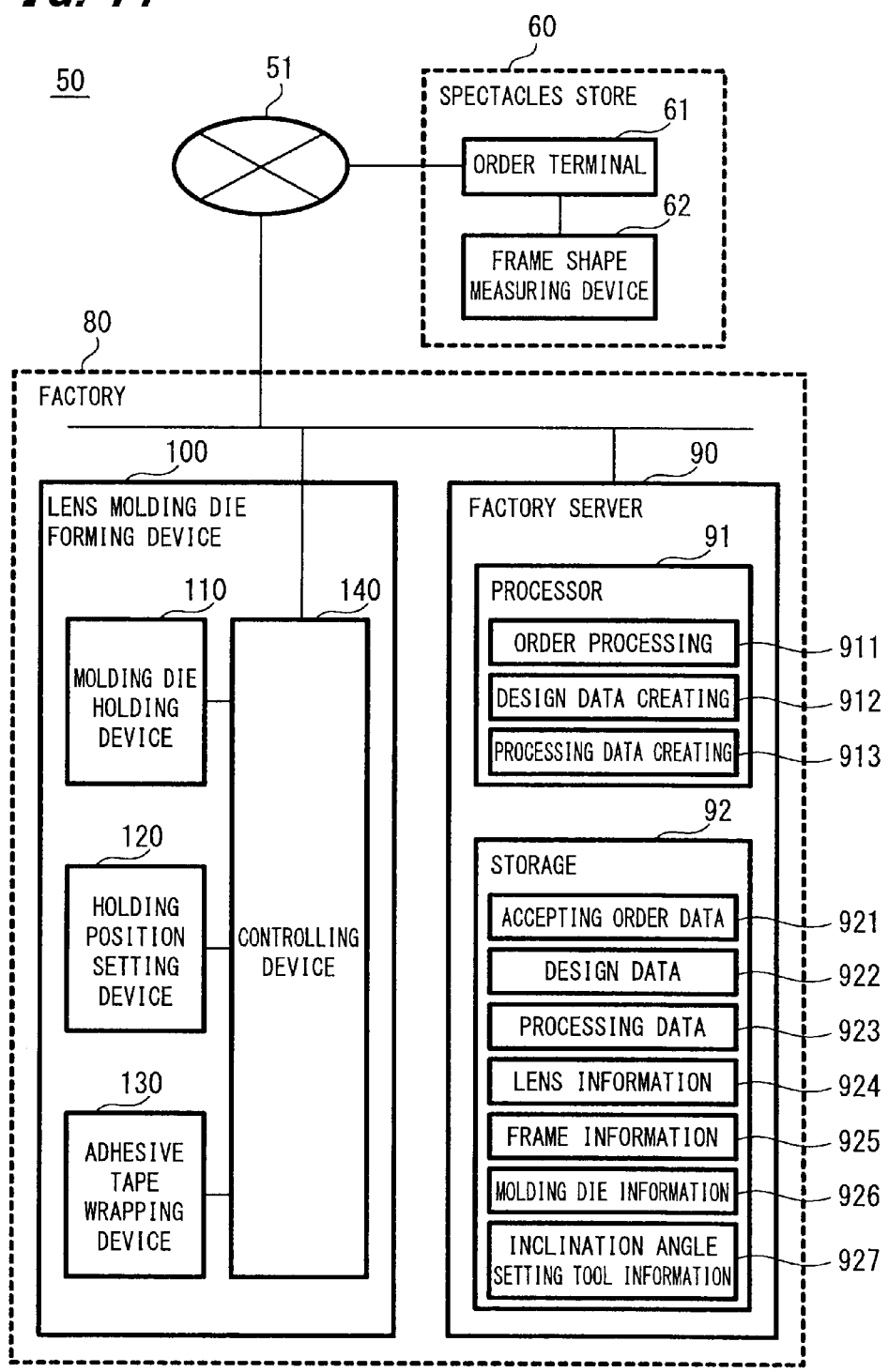
FIG. 11 is a block diagram showing the configuration of a lens molding die forming system including a lens molding die forming device.

FIG. 9 is a flowchart for explaining the production method of the progressive-addition plastic lens and the spectacles using the lens according to the present embodiment. The production method according to the present embodiment includes a lens molding die forming step, which is to be described later, and the lens molding die forming step is performed by using a lens molding die forming device. A lens molding die forming system and a lens molding die forming device incorporated into the lens molding die forming system will be described below, wherein the lens molding die forming system is adapted to receive an online order of the spectacle lens, and assemble a molding die for forming the spectacle lens based on the order details. FIG. 11 is a block diagram showing the schematic configuration of the lens molding die forming system, FIGS. 12A, 12B, 13C and 13D are views showing the operation of a molding die holding device of the lens molding die forming device.

A lens molding die forming system 50 shown in FIG. 11 constitutes a part of a spectacle lens supply system adapted to produce a spectacle lens according to an online order received from a customer, wherein examples of the customer include a spectacles store 60, and examples of a lens manufacturer include a factory 80 of a lens maker. The spectacles store 60 and the factory 80 are connected to each other through a communication medium 51, wherein the communication medium 51 may be, for example, a public communication line, an exclusive line, the internet and the like; and it is also possible to provide a relay station on the way. Incidentally, although the following description is given based on a case where the customer is the spectacles store 60, the present invention is not so limited. For example, the customer may also be an ophthalmologic clinic, a person, and a sales office of the lens maker. Further, although FIG. 11 only shows one customer, a plurality of customers may be connected to the manufacturer via the communication medium 51.

The spectacles store 60 is provided with a computer, as an order terminal, and a frame shape measuring device 62 for measuring the shape of the spectacle frame (i.e., inner peripheral shapes of both rims and outer peripheral shapes of both edged lenses). The order terminal 61 has a communication section for connecting the order terminal 61 with the factory through the communication medium 51, so that information necessary for ordering lens can be transmitted and received.

The factory 80 has a factory server 90 and a lens molding die forming device 100. The factory server 90 is a computer adapted to receive the order from the order terminal 61, create the data necessary for producing the lens based on the order details, and store the data. The lens molding die forming device 100 is adapted to form the lens molding die based on the order details, the created data and the like.

The factory server 90 has a processor 91 and a storage 92. The processor 91 has an order processing function 911, a design data creating function 912, and a processing data creating function 913. The order processing function 911 is adapted to receive the order from the order terminal 61 and store the order as accepting order data 921. The design data creating function 912 is adapted to calculate the shape of the spectacle lens based on the accepting order data 921 and store the shape of the spectacle lens as design data 922. The processing data creating function 913 is adapted to create control data and processing conditions of the devices in various kinds of producing steps based on the accepting order data 921 and the design data 922, and store the created control data and processing conditions as processing data 923. In addition to the accepting order data 921, the design data 922 and the processing data 923, the storage also stores lens information 924, frame information 925, molding die information 926, inclination angle setting tool information 927 and the like necessary for the processor 91 to perform process, wherein the molding die information 926 and the inclination angle setting tool information 927 are information about the first and second molding dies.

The design data creating function 912 has a function of calculating the lens shape of the uncut lens and calculating the lens shape of the lens after being subjected an assumed edging process. Further, in the case where the ordered lens is a progressive-addition lens, the design data creating function 912 has a function of designing the lens shape of the lens having an uncut prism thinning applied thereto, and a function of designing the lens shape of the lens having an edged prism thinning applied thereto. Further, the shape information of the lens front surface and the lens back surface of the respective lens shapes, the information about the arrangement of the front surface and the back surface, the information about the assumed shape of the edged lens, the information about the position of the prism measuring reference point, the prismatic power and the like are stored in the design data 922. Incidentally, in the case where the prescription prism is not assigned in the accepting order data, the prismatic power is the uncut prism thinning and the base direction (vertical) thereof, and the edged prism thinning and the base direction (vertical) thereof.

Further, in the case where the ordered lens is a progressive-addition lens, the processing data creating function 913 has a function of calculating the first molding face inclination angle $\theta_1$, the molding die inclination angle $\theta_2$, the molding face inclination angle $\theta_3$ and the inclination direction based on the prismatic power in the case where the uncut prism thinning has been applied (the uncut prism thinning in the case where there is no prescription prism) or based on the prismatic power in the case where an edged prism thinning has been applied (the edged prism thinning in the case where there is no prescription prism) stored in the design data 922. Further, inclination angle setting tools 116A, 116B used in the first molding die 21, the second molding die 22 and a molding die holding device 110 are selected, wherein the first molding die 21, the second molding die 22 and a molding die holding device 110 are used based on the design data 922, the molding die information 926 and the inclination angle setting tool information 927, and wherein the design data 922 includes the calculated angles $\theta_1$, $\theta_2$, $\theta_3$ and the inclination direction. Further, in the case where the prescription prism is assigned, attachment rotation angles of the inclination angle setting tools 116A, 116B are also determined. Further, a molding die holding distance is calculated. The calculated angles $\theta_1$, $\theta_2$, $\theta_3$, the tools (the first molding die 21, the second molding die 22 and the inclination angle setting tools 116A, 116B) to be used, the attachment rotation angles of the inclination angle setting tools, the molding die holding distance and the like are stored in the processing data 923.

Here, the accepting order data includes, for example, spectacle lens information, spectacle frame information, the prescription values, layout information and the like. The spectacle lens information includes: the lens material, the refractive index, the optical design of the lens front surface and the lens back surface, the lens outer diameter, the lens center thickness, the edge thickness, the decentering, the base curve, the corridor length, the inset, the kind of edging process, the dyeing color, the kind of coating, the kind of prism thinning (uncut prism thinning, edged prism thinning), and the like. The spectacle frame information includes: the identification name of product, the size of the frame, the material, the frame curve, the edged-lens shape, the frame shape measured by a frame tracer, and the like. The prescription values include: the spherical power, the cylindrical power, the cylinder axis, the prescription prism, the addition power and the like. The layout information includes: the papillary distance, the near papillary distance, the eye point position, and the like.

The lens molding die forming device 100 includes the molding die holding device 110, a holding position setting device 120, an adhesive tape wrapping device 130, and a controlling device 140 which is a computer adapted to control these devices.

The molding die holding device 110 has a first molding die holding section 111A for holding the first molding die 21, a first inclination angle setting section 115A for setting an inclination angle at which the first molding die 21 is held by the first molding die holding section 111A, a second molding die holding section 111B for holding the second molding die 22, and a second inclination angle setting section 115B for setting an inclination angle at which the second molding die 22 is held by the second molding die holding section 111B.

The first molding die holding section 111A has a first aspiration tube 112A, a first absorbent pad 113A arranged on the side of the tip-end of the first aspiration tube 112A, and a first joint 114A for connecting the first aspiration tube 112A with the first absorbent pad 113A in a vented state. Similarly, the second molding die holding section 111B has a second aspiration tube 112B, a second absorbent pad 113B arranged on the side of the second aspiration tube 112B, and a second joint 114B for connecting the second aspiration tube 112B with the second absorbent pad 113B in a vented state. The aspiration tubes 112A, 112B are connected to a vacuum generator (such as a vacuum pump or ejector) not shown in the drawings. The aspiration tubes 112A, 112B are configured so as to be able to be rotated by a driving section (not shown in the drawings) with a rotation axis B as the rotation center, as well as to be able to be moved inward and outward along the rotation axis B. The absorbent pads 113A, 113B are made of rubber. In a state where the absorbent pad 113A, 113B are brought into close contact with the non-molding faces of the molding dies, a negative pressure is generated in the absorbent pads 113A, 113B due to being aspirated by the aspiration tubes 112A, 112B, and thereby the molding dies are held by the absorbent pads 113A, 113B. The joints 114A, 114B connect the absorbent pads 113A, 113B with the aspiration tubes 112A, 112B in a manner that allows the absorbent pads 113A, 113B to be inclined in all directions with respect to the aspiration tubes 112A, 112B as well as to be moved in a plane perpendicular to the rotation axis B. The switching operation between movement and fixation of the inclination and movement in the vertical plane of the absorbent pads 113A, 113B can be performed by remote control. The aspiration tubes 112A, 112B are arranged in the rotation axis B, and the absorbent pads 113A, 113B are arranged facing the inward side of the rotation axis B. Incidentally, the second joint may also be configured so that it can not incline the second absorbent pad 113B. In such a case, in the molding die holding step, since the second molding die 22 can be held so that the rotational position with the reference axis B as the center is adjustable, and the first molding die 21 can be held so that the inclination angle of the reference axis B thereof in the vertical direction is adjustable, the configuration of the molding die holding device 110 can be simplified.

The first inclination angle setting section 115A includes a first inclination angle setting tool 116A for setting the holding angle of the first molding die 21 with respect to the rotation axis B, and a first fixing member 117A for fixing the first inclination angle setting tool 116A. The first fixing member 117A is a cylindrical member, and is fixed around the first aspiration tube 112A so that the central axis of the first fixing member 117A is aligned with the rotation axis B. Similarly, the second inclination angle setting section 115B includes a second inclination angle setting tool 116B for setting the holding angle of the second molding die 22 with respect to the rotation axis B, and a second fixing member 117B for fixing the second inclination angle setting tool 116B. The second fixing member 117B is a cylindrical member, and is fixed around the second aspiration tube 112B so that the central axis of the second fixing member 117B is aligned with the rotation axis B. The ends of the fixing member 117A, 117B on the inward side of the rotation axis B are configured such that the inclination angle setting tools 116A, 116B can be attached.

The first inclination angle setting tool 116A is a cylindrical member, and is fixed to the tip-end of the first fixing member 117A so that the central axis of the first inclination angle setting tool 116A is aligned with the rotation axis B. Similarly, the second inclination angle setting tool 116B is a cylindrical member, and is fixed to the tip-end of the second fixing member 117B so that the central axis of the second inclination angle setting tool 116B is aligned with the rotation axis B. The inclination angle setting tools 116A, 116B are each provided with a connecting portion at their ends on the outward side of the rotation axis B for being connected to the fixing members 117A, 117B, and the tip-ends of the inclination angle setting tools 116A, 116B on the inward side of the rotation axis B (also referred to as "inclination angle setting ends" hereinafter) are each located in the same plane. In the present embodiment, since the first molding die 21 and the second molding die 22 are held by the first aspiration tube 112A and the second aspiration tube 112B so that the second molding die 22 is perpendicular to the rotation axis B and the first molding die 21 is inclined with respect to the rotation axis B, the plane in which the tip-end of the first inclination angle setting tool 117A on the inward side of the rotation axis B is located is inclined with respect to the rotation axis B, and the plane in which the tip-end of the second inclination angle setting tool 117B on the inward side of the rotation axis B is located is perpendicular to the rotation axis B. The inclination angle setting tools 116A, 116B are configured so that the attachment direction around the rotation axis B can be arbitrarily set with respect to the fixing members 117A, 117B.

The holding position setting device 120 is adapted to set the holding positions of the molding dies 21, 22 in the vertical direction with respect to the molding die holding sections 111A, 111B to predetermined positions, and has a function of positioning the geometrical centers of the molding dies 21, 22 in a holding axis B when viewed from the direction of the holding axis B. The holding position setting device 120 includes a plurality of abutting surface portions each having a surface parallel to the holding axis B, and a driving section adapted to move the plurality of abutting surface portions so that the plurality of abutting surface portions can be simultaneously moved forward to and backward from the rotation axis B in the direction perpendicular to the rotation axis B. It is preferred that the abutting surface portions respectively abut the molding dies 21, 22 from three or more directions at substantially equal intervals.

The adhesive tape wrapping device 130 includes a tape holding section adapted to hold the roll of the adhesive tape by a shaft parallel to the rotation axis B in a rotatable manner, a tape attaching mechanism adapted to pull out the adhesive tape from the roll of the adhesive tape and attach the adhesive face of the tip-end of the adhesive tape to the circumferences of the molding dies 21, 22, and a tape cutting mechanism adapted to cut off the adhesive tape after the tape has been wrapped.

The controlling device 140 is connected to the factory server 90 via a network, and can receive the accepting order data, the design data, the processing data and the like stored in the storage 92 of the factory server 90. The controlling device 140 includes a controller adapted to control a rotational driving section and a movement driving section of the aspiration tube 112A, 112B of the molding die holding device 110, a vacuum generator, a movement/fixation switching section of the joints, a tape attaching mechanism driving section, a tape cutting mechanism driving section, an abutting surface portions driving section of the holding position setting device 120, and the like. The controlling device may be a computer, a programmable controller, or a combination of the both.

Figure 12A:
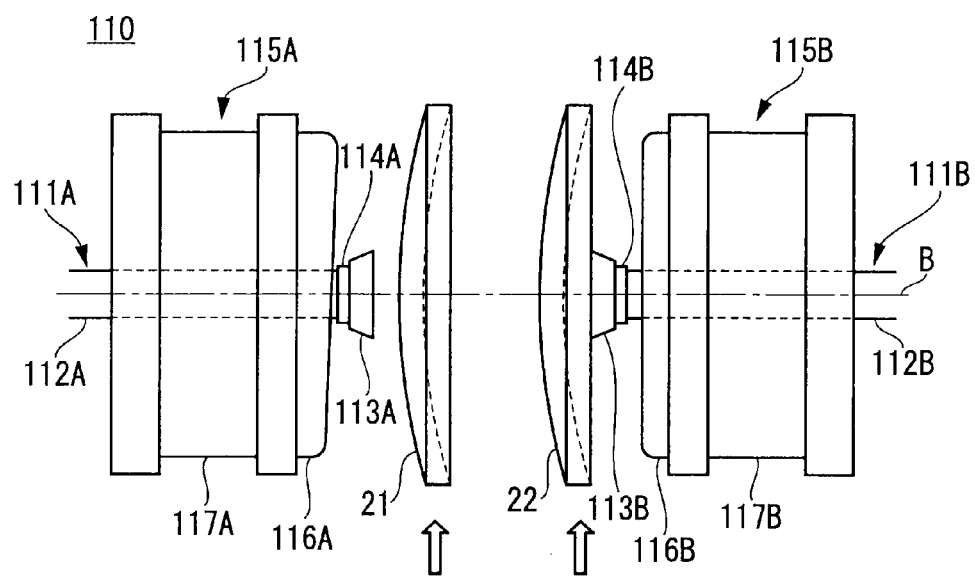
FIGS. 12A and 12B are views for explaining the operation of a molding die holding device of the lens molding die forming device.
Figure 12B:
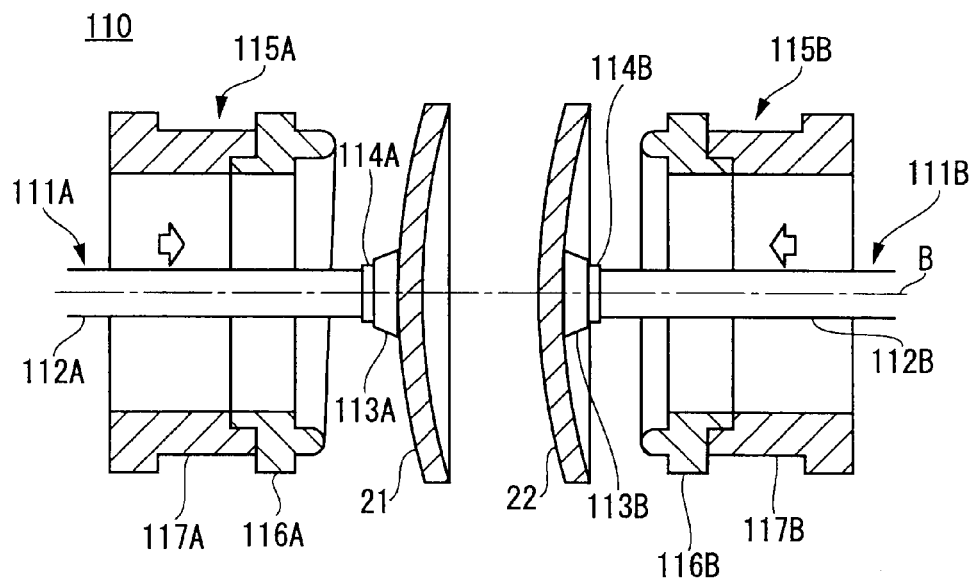
Figure 13C:
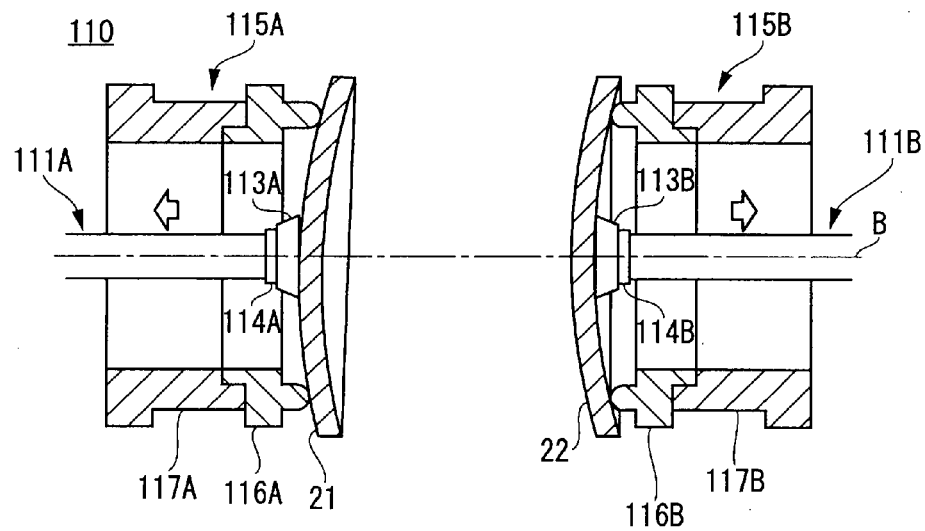
FIGS. 13C and 13D are other views for explaining the operation of the molding die holding device of the lens molding die forming device.
Figure 13D:
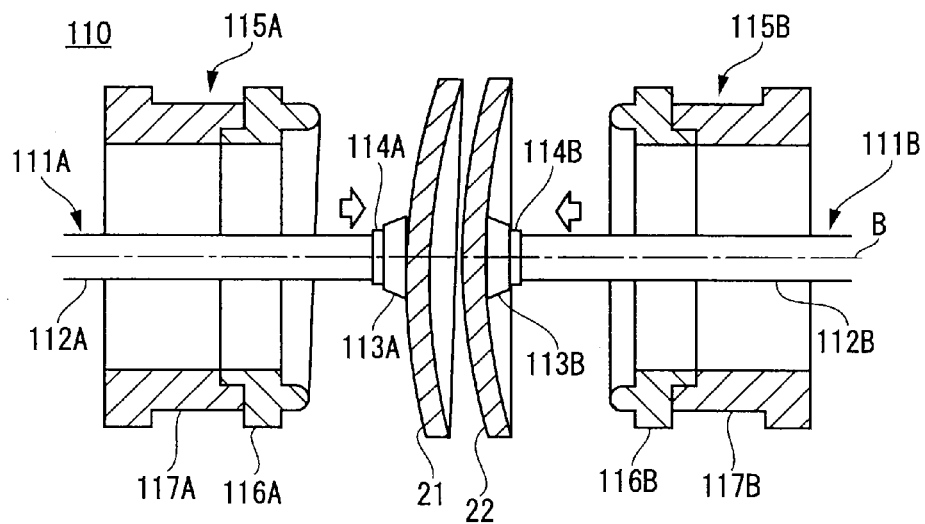

Next, the operation of the lens molding die forming device 100 will be described below with reference to FIGS. 9, 11, 12A, 12B, 13C, and 13D. Incidentally, among FIGS. 12A, 12B, 13C and 13D, FIG. 12A is a side view of the molding die holding device, FIGS. 12B, 13C and 13D are cross sections of the molding die holding device (however, the first molding die holding section 111A and the second molding die holding section 111B are side views). Incidentally, the description is made based on a case where the progressive lens to be formed includes no prescription prism.

First, after receiving the order of the progressive-addition lens from the spectacles store 60, the factory server 90 creates the accepting order data and the design data by the order processing section 911 and the design data creating section 912. Further, the processing data creating section acquires the accepting order data and the design data (accepting order data and design data acquiring step (step S1)), and creates the processing data based on the accepting order data and the design data. At this time, the processing data creating section 913 calculates the first molding face inclination angle $\theta_1$ and the molding face inclination angle $\theta_3$ (molding face inclination angle calculating step (step S2)). Further, the first molding die 21 and the second molding die 22 used in the lens molding die 20 are selected based on the calculated angles and the design data 922.

Further, the molding die inclination angle $\theta_2$ is calculated based on the calculated molding face inclination angle $\theta_3$ and the first molding face inclination angle $\theta_1$ of the first molding die 21, and the inclination angle setting tools 116A, 116B to be used are selected based on the molding die inclination angle $\theta_2$. Further, the holding distance of the both molding dies 21, 22 is calculated, data for controlling the movement of the molding die holding sections 111A, 111B of the molding die holding device 110 in the direction of the rotation axis is created based on the calculated holding distance of the molding dies 21, 22 (molding die inclination angle and distance calculating step (step S3)).

Next, the first molding die 21 and the second molding die selected in step S2 are respectively attached to the molding die holding sections 111A, 111B of the molding die holding device 110, and the relative position and the relative inclination angle between the first molding die 21 and the second molding die 22 are set so that the molding face inclination angle $\theta_3$ becomes the value calculated in step S2 and the molding die holding distance becomes the value calculated in step S3, and the first molding die 21 and the second molding die 22 are held in such state (molding die holding step (step S4)). The molding die holding step will be described below in more detail with reference to FIGS. 12A, 12B, 13C, and 13D.

First, the first inclination angle setting tool 116A selected based on the processing data 923 is attached to the first fixing member 117A, and the second inclination angle setting tool 116B is attached to the second fixing member 117B. Next, the first molding die 21 and the second molding die 22 selected based on the processing data 923 are disposed between the first pad and the second pad so that the positions of the geometrical centers of the first molding die 21 and the second molding die 22 are substantially in the holding axis B (FIG. 11(a)). At this time, in the case where the molding face 22A of the second molding die 22 is a toroidal surface or atoroidal surface, the relative rotational position between the first molding die 21 and the second molding die 22 is set based on the angle of the cylinder axis of the accepting order data. Incidentally, the relative rotational position between the both molding dies may also be set by rotating the aspiration tubes 112A, 112B after the molding dies 21, 22 have been attached.

Next, the first aspiration tube 112A and the second aspiration tube 112B are respectively moved toward the inward side of the rotation axis B, so that the non-molding face of the first molding die 21 is brought into close contact with the first absorbent pad 113A, and the non-molding face of the second molding die 22 is brought into close contact with the second absorbent pad 113B. Further, a negative pressure is generated inside the aspiration tubes 112A, 112B and the absorbent pads 113A, 113B by the vacuum generator, and thereby the molding dies 21, 22 are attached to the absorbent pads 113A, 113B. At this time, the joints 114A, 114B are fixed so that the molding dies 21, 22 are held in a state where the centers of the absorbent pads 113A, 113B are located in the holding axis B, and the directions of the absorbent pads 113A, 113B are not inclined with respect to the holding axis (FIG. 11(b)).

Thereafter, the joints 114A, 114B are switched to the movable state so that the absorbent pads 113A, 113B become movable in the vertical direction and the inclination direction with respect to the holding axis, and the aspiration tubes 112A, 112B are moved toward the outward side of the rotation axis B, so that the non-molding face of the first molding die 21 is brought into close contact with the tip-end of the first inclination angle setting tool 116A, and the non-molding face of the second molding die 22 is brought into close contact with the tip-end of the second inclination angle setting tool 116B. Further, the abutting surface portions of the holding position setting device 120 are simultaneously moved in four directions (i.e., two directions on the upper side, and two directions on the lower side) forward to the rotation axis in the direction perpendicular to the rotation axis B so that the circumferential portion of the first molding die 21 is abutted by all abutting surface portions at positions the same distance from the rotation axis B, and thereafter the first joint 114A is brought back to the fixation state. Similarly, the circumferential portion of the second molding die 22 is also abutted by all abutting surface portions at positions the same distance from the rotation axis B, and thereafter the second joint 114B is brought back to the fixation state. Thus, the first molding die 21 is held at a predetermined inclination angle, and the second molding die 22 is held vertically. Further, the geometrical centers of the outlines of the molding dies 21, 22 are each located in the rotation axis B when viewed from the direction of the rotation axis B (FIG. 11(c)).

Next, the aspiration tubes 111A, 111B are each moved toward the inward side of the rotation axis B so that the molding die holding distance becomes the value set based on the processing data (FIG. 11 (d)).

Next, the tape attaching mechanism of the adhesive tape wrapping device 130 pulls out the adhesive tape from the roll of the adhesive tape held by the shaft parallel to the rotation axis in a rotatable manner to attach the adhesive tape to the circumferential surfaces of the molding dies, and simultaneously rotates the aspiration tubes 112A, 112B around the rotation axis by more than one turn, and thereby the adhesive tape 23 is wrapped around the circumferences of the both molding dies. Thereafter, the tape cutting mechanism is driven to cut the excess tape (adhesive tape wrapping step (step S5)). The adhesive tape is wrapped while being tensioned so that circumferential surfaces 21B, 22B of the both molding dies 21, 22 are brought into contact with the adhesive face of the adhesive tape. Incidentally, while wrapping the adhesive tape, the rotation axis may be, for example, identical to one of the reference axes $A_1$, $A_2$ of the molding dies, or be a rotation axis having an intermediate angle between the reference axes $A_1$, $A_2$.

Incidentally, the steps between step S2 and step S5 are also referred to as a "lens molding die forming step". The lens molding die 20 formed in the aforesaid manner is transferred to a lens material liquid pouring step described below.

Next, a part of the adhesive tape 23 of the lens molding die 20 formed in step S5 is peeled off, so that an inlet is formed which opens the cavity 24 to outside. The plastic lens material liquid is poured into the cavity 24 from the inlet. The pouring of the lens material liquid is stopped as the lens material liquid has filled the cavity 24 and reached the inlet, and then the inlet is wrapped again by the adhesive tape 23 (lens material liquid pouring step (step S6)).

The monomer composition for preparing the lens material liquid used in the present invention is not particularly limited, and examples of the monomer composition capable of achieving the advantages of the production method of the present invention include a composition containing a polythiourethane resin. Examples of the polythiourethane resin include a combination of a polyisocyanate compound and a polythiol compound, and an epithio group-containing compound. Examples of the epithio group-containing compound include bis(β-epithiopropyl)sulfide, bis(β-epithiopropyl)disulfide, and the like. Examples of the polyisocyanate compound include 1,3-diisocyanatemethyl-cyclohexane, diisocyanate and the like. Examples of the polythiol compound include pentaerythritol tetrakis(2-mercaptoacetate), 2,5-dimercaptomethyl-1,4-dithiane, mercaptomethyl-dithia-octanedithiol, bis(mercaptomethyl)-trithiaundecane-dithiol and the like.

Known additives typically used in the production of plastic lens may be added to the monomer composition used in the present invention in a range which does not undermine the effects of the present invention.

Examples of the additives include, for example, additives for improving light absorption characteristics, additives for improving weather resistance, additives for improving molding workability and the like, wherein examples of the additives for improving light absorption characteristics include ultraviolet absorber, dye, pigment and the like, examples of the additives for improving weather resistance include antioxidant, color protection agent and the like, and examples of the additives for improving molding workability include mold release agent and the like.

Examples of the ultraviolet absorber include, for example, benzotriazole-based products, benzophenone-based products, salicylic acid-based products and the like; examples of the dye and pigment include, for example, anthraquinone-based products, azo-based products and the like. Examples of the antioxidant and the color protection agent include, for example, monophenol-based products, bisphenol-based products, polymer phenol-based products and the like; and examples of the mold release agent include, for example, fluorinated surfactant, silicone-based surfactant, alkyl acid phosphate, higher fatty acid and the like.

Next, the lens molding die 20 filled with the monomer composition is put into a polymerization oven and heated to a predetermined temperature so that the monomer of the material is polymerized and cured (curing step (step S7)). After polymerization has been completed, the lens molding die 20 is taken out from the polymerization oven and cooled to the room temperature, and then the adhesive tape 23, the first molding die 21 and the second molding die 22 are removed to obtain a progressive-addition plastic lens (lens molding die removing step (step S8)).

As described above, by configuring the lens molding die 20 and forming a lens using the lens molding die 20 by a cast polymerization method, it is possible to produce a progressive-addition plastic lens having a prism thinning applied thereto as an uncut lens (i.e., a finished lens prior to edging) whose front surface is progressive-addition surface.

Various kinds of surface treatment are applied to the front and back surfaces of the progressive lens according to the order details (various coating step (step S9)), then the lens is subjected to an edging process (i.e., an edge grinding process) to become desired edged lens (edging process step (step S10)), and attached to a spectacle frame to become a pair of spectacles (spectacle frame attaching step (step S11)). Since steps S9 to S11 can be performed using known conventional arts, the detail description thereof will be omitted.

Figure 8A:
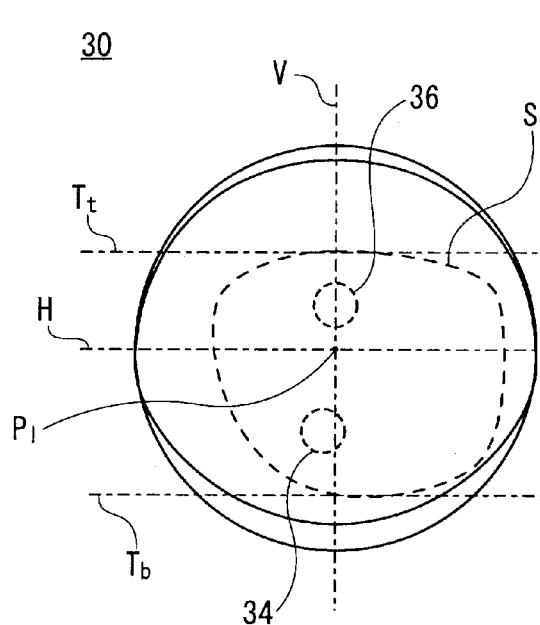
FIG. 8A is a front view showing a progressive-addition plastic lens formed by the production method of the present invention.
Figure 8B:
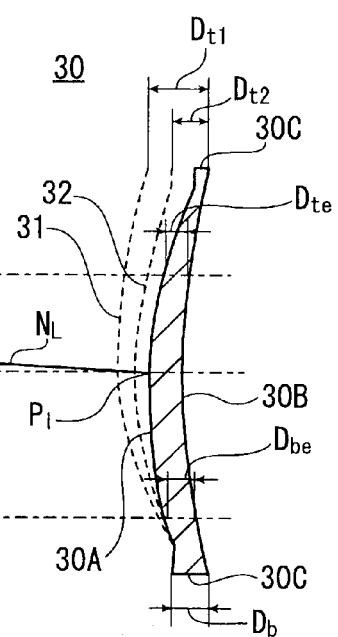
FIG. 8B is a cross section showing a vertical direction passing through the prism measuring position of the same lens.

An example of a progressive-addition plastic lens 30 prior to edging process produced by the aforesaid production method is shown in FIGS. 8A and 8B. FIG. 8A is a front view of the progressive-addition lens, and FIG. 8B is a cross section taken along a vertical cross section V passing through a prism measuring position P1 of the same lens.

The progressive-addition plastic lens 30 shown in FIGS. 8A and 8B has a lens front surface 30A which is a progressive-addition surface, and a lens back surface 30B which is any one of a spherical surface, an aspherical surface, a toroidal surface and an atoroidal surface, wherein a circumferential surface 30C is formed in the circumference of the lens front surface 30A and the circumference of the lens back surface 30B. The lens has a circular shape as seen in front view, and the prism measuring position P1 is located at the center of the lens front surface.

An edged prism thinning is applied to the progressive-addition plastic lens 30 shown in FIGS. 8A and 8B. Thus, the normal line $N_L$ at the prism measuring position is inclined in the vertical direction with respect to the normal line of the lens back surface passing through the prism measuring position P1, and the upper end and the lower end of the progressive-addition plastic lens 30 have different edge thicknesses (in the present example, the edge thickness of the upper end is thinner than the edge thickness of the lower end). Further, when an edged lens shape S in the progressive-addition plastic lens 30 is assumed, an upper edge thickness $D_{te}$ and a lower edge thickness $D_{be}$ of the edged lens shape S in the vertical cross section V at the position of an uppermost tangent $T_t$ and the position of a lowermost tangent $T_b$ parallel to a horizontal cross section H passing through the prism measuring position P1 are smaller than those in the case where no prism thinning is applied or the case where an uncut prism thinning is applied. Incidentally, an example of the lens front surface in the case where no prism thinning is applied is shown by dotted line 31; in such a case, the edge thickness of the upper end is shown as $D_{t1}$, and the edge thickness of the lower end is shown as $D_b$. Further, an example of the lens front surface in the case where an uncut prism thinning is applied is shown by dotted line 32; in such a case, the edge thickness of the upper end is shown as $D_{t2}$, and the edge thickness of the lower end is shown as $D_b$. In such progressive-addition plastic lens 30, since the both surfaces are optically finished, the conventional cutting/polishing steps are not necessary.

Figure 6:
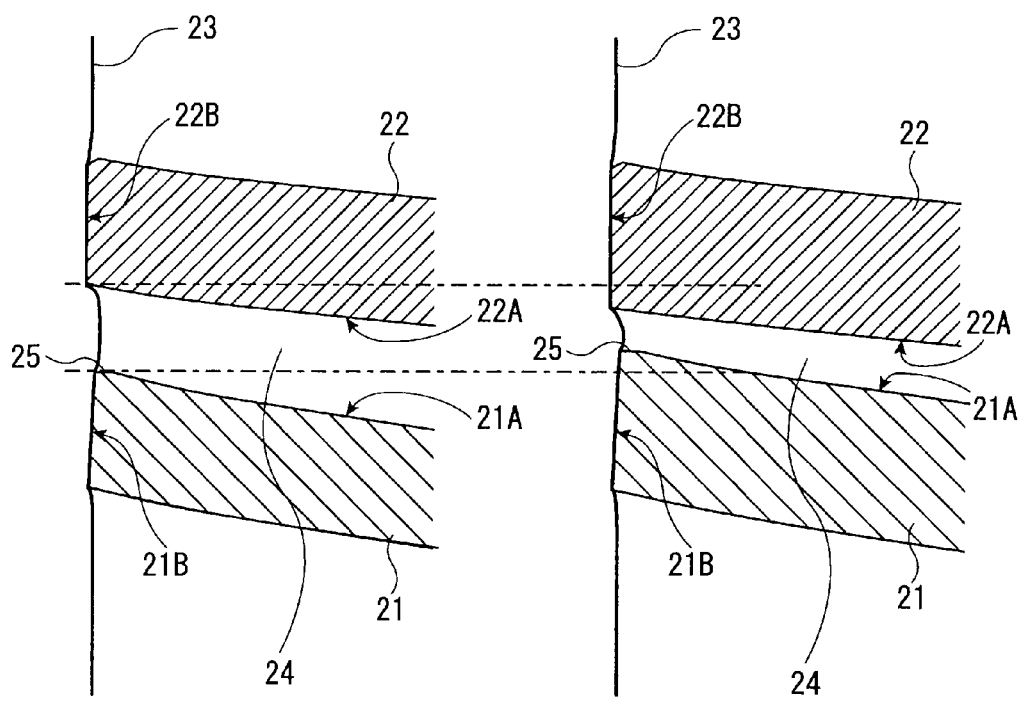
FIG. 6 shows the lens molding die before and after the polymerization shrinkage of the monomer inside the lens molding die has happened.

The curing step (step S7) in the aforesaid production method will be described below in further more detail. When the lens molding die 20 filled with the lens material liquid is put into the polymerization oven where the monomer of the material is polymerized at a predetermined temperature, the composition filled in the cavity 24 will be shrunk due to the polymerization of the monomer. FIG. 6 shows the circumstance of the shrinkage due to the polymerization. In FIG. 6, the view on the left side shows the lens molding die 20 before the composition filled in the cavity 24 is polymerized and shrunk, and the view on the right side shows the lens molding die 20 after the composition filled in the cavity 24 has been polymerized and shrunk.

As shown in FIG. 6, with the polymerization shrinkage of the monomer, one or both of the first molding die 21 and the second molding die 22 slides toward the other along the inner surface (i.e., the adhesive face) of the adhesive tape 23 while the directions of the molding faces 21A, 22A remain unchanged. At this time, in order for the entire circumference of the first molding die 21 and the entire circumference of the second molding die 22 to uniformly slide along the inner surface (i.e., the adhesive face) of the adhesive tape 23, the holding force of the adhesive tape 23 needs to be controlled in a preferred range.

In the case where the holding force of the adhesive tape 23 is in a preferred range, the adherence of the adhesive tape will be suitably decreased while the monomer is being polymerized, and therefore the at least one of the first molding die 21 and the second molding die 22 will be easily moved under the stress caused by the polymerization shrinkage. In other words, at the circumferential surfaces 21B, 22B, the first molding die 21 and the second molding die 22 will move toward inner side along the inner surface of the adhesive tape 23. Thus, the first molding die 21 and the second molding die will uniformly move in the entire circumferences in the direction in which the one molding die becomes close to the other molding die.

Thus, due to the uniform movement of the first molding die 21 and the second molding die 22, the behavior of the molding die caused by the polymerization shrinkage is assumable, and the error between the shape of the progressive-addition plastic lens produced with the lens molding die 20 formed considering the polymerization shrinkage and the design values can be eliminated, so that the progressive-addition plastic lens can be produced with high accuracy.

Figure 7:
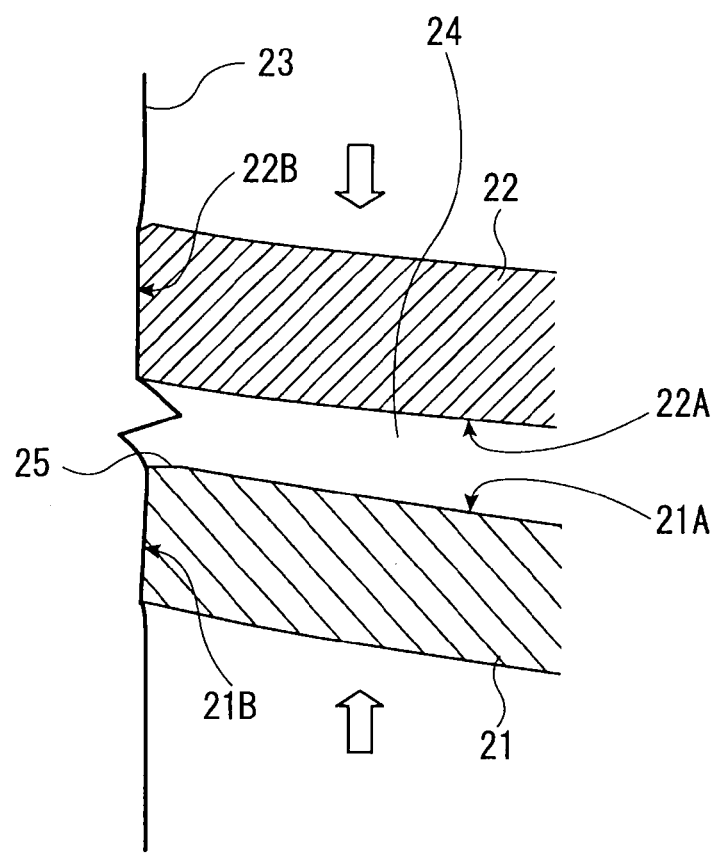
FIG. 7 is an enlarged view showing the vicinity of the adhesive tape of the lens molding die in a state where the adhesive tape is irregularly deformed.

However, if the holding force of the adhesive tape is higher than the preferred range, the adhesive tape will not be peeled off from the first molding die 21 and the second molding die 22 during the polymerization shrinkage, and therefore the adhesive tape will be irregularly deformed. FIG. 7 is an enlarged view showing the vicinity of the adhesive tape 23 of the lens molding die 20 in a state where the adhesive tape is deformed.

As shown in FIG. 7, the deformation of the adhesive tape 23 is caused on the lateral side of the cavity 24 of the lens molding die 20. There is a possibility that no problem will be caused if the deformation of the adhesive tape 23 is uniformly caused on the entire circumference of lens molding die 20, this is because in such a case, the first molding die 21 and the second molding die 22 will respectively move while the directions thereof remain unchanged in the same manner as the case where the holding force of the adhesive tape is in the preferred range; however, in most cases, since the deformation of the adhesive tape is caused partially, the relative position and direction between the molding face 21A of the first molding die 21 and the molding face 22A of the second molding die 22 do not remain unchanged, and therefore error from the design values of the progressive-addition plastic lens will be increased.

In the conventional method for producing a progressive lens using a lens blank, since there is a step of cutting/polishing the optically unfinished surface of the lens blank, the thickness of the formed lens blank and the shape of the molding face to be cut are not necessary to be made exactly. However, in the production method of the present embodiment, the lens molding die is configured based on the design values of the progressive-addition plastic lens and considering the polymerization shrinkage, and a prism thinning of the progressive-addition plastic lens is formed by using such lens molding die. Thus, the shape of the cavity of the lens molding die after polymerization shrinkage, i.e., the distance and the inclination between the first molding die and the second molding die, will directly affect the accuracy of the progressive-addition plastic lens.

Thus, in the method for producing the progressive-addition plastic lens using the lens molding die of the present embodiment, it is necessary to use an adhesive tape having a suitable holding force.

The adhesive tape and the holding force thereof will be described below.

The adhesive tape, which constitutes the lens molding die, includes a film (as a base material) and adhesive agent.

The base material is not particularly limited, but can be formed by processing the following material into a film-like shape: a polyolefin such as polyethylene, polypropylene or the like, or a polyester such as polythylene telephthalate, polybutylene terephthalate, polyethylene naphthalate or the like.

An acrylic adhesive agent or a silicon-base adhesive agent, for example, may be preferably used as the adhesive agent.

Further, an interlayer may be provided in order to improve the adhesion between the base material and the adhesive agent.

Since it is necessary to maintain the holding force for fixing the both molding dies to predetermined positions during the period from the time when the adhesive tape is attached to the circumferential surfaces of the first molding die and the second molding die and the lens material liquid is poured until the time when the polymerization reaction of the lens material liquid is happened, and since it is necessary to facilitate the operation of wrapping the adhesive tape around the both molding dies, the thickness is of the base material is set so that suitable holding force and flexibility can be obtained. Further, the base material needs to be selected so as to have resistance to the lens material liquid and resistance to both the heat for the polymerization reaction and the heat of reaction in the polymerization reaction process so that it does not deform.

Further, the adhesive agent needs to have resistance to the lens material liquid so that, when the lens material liquid is being poured into the lens molding die and hot-cured, the adhesive agent will not be dissolved in the lens material liquid to cause optical deficiency of the lens.

Figure 10:
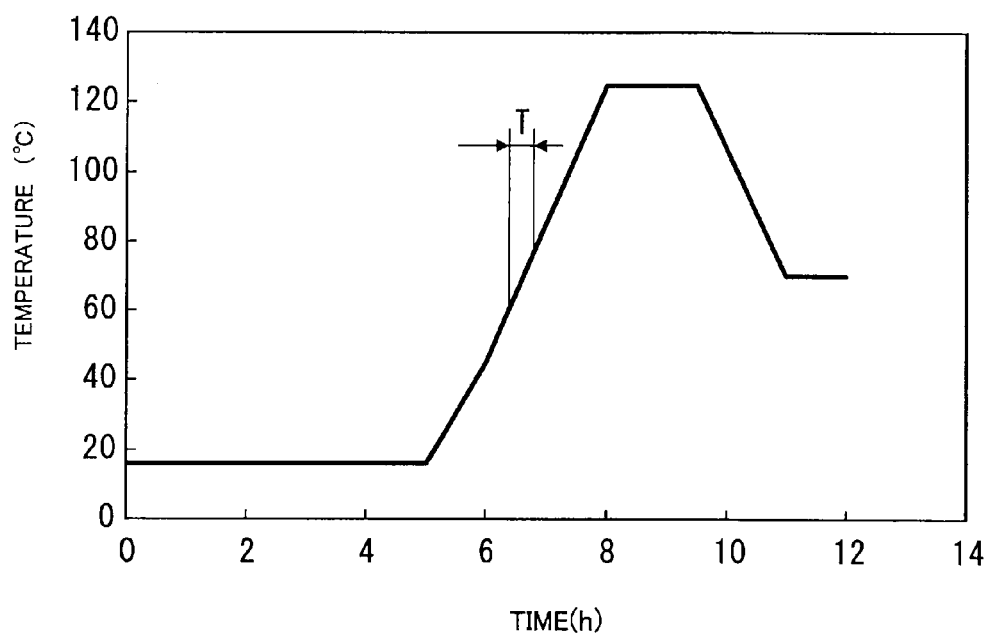
FIG. 10 is a graph showing the relation between time and temperature in a heating curing step of the lens molding die in which the monomer composition is filled.

The polymerization reaction of the monomer composition is achieved by heating or irradiating ultraviolet light onto a monomer composition containing a polymerization catalyst and a polymeric initiator. As an example of the polymerization reaction of such monomer composition, a typical case of thermal polymerization will be described below. FIG. 10 is a graph showing the relation between time and temperature in the polymerization reaction.

First, a casting mold into which a lens material liquid containing the monomer composition has been poured is kept at a relatively lower temperature, 20° C. for example, so that the viscosity of the monomer composition increases slowly. Next, the temperature of the lens molding die is gradually raised to or over the reaction temperature of the monomer, 100° C. for example, and thereby the monomer is gelled and solidified. Further, the temperature is raised to a sufficient level and maintained at that level. At such temperature, the polymerization reaction of the monomer proceeds sufficiently, so that the lens material liquid is cured to form a lens.

Under low temperature, the adhesive agent of the adhesive tape needs to have sufficient holding force to maintain the shape of the lens molding die. Further, when the temperature of the lens molding is being raised, the adherence of the adhesive tape needs to decrease so that during the polymerization shrinkage of the monomer, the first molding die and the second molding die can move easily with the shrinkage of the monomer.

If the adherence of the adhesive tape does not sufficiently decrease during the hot curing, the movement of the first molding die and the second molding die will be difficult. As a result, as described with reference to FIG. 7, the stress caused by the polymerization shrinkage will be concentrated on the lateral side of the cavity of the adhesive tape, and therefore the adhesive tape will deform.

Further, if the adherence of the adhesive tape under low temperature is not sufficient, the adhesion between the adhesive tape and both the circumferential surface of the first molding die and the circumferential surface of the second molding die will be low. As a result, the monomer composition will be leaked out, and air will be drawn into the cavity.

Thus, in the present invention, the holding force of the adhesive tape is set in a preferred range. The preferred range of the holding force (the adherence) of the adhesive tape will be described below.

The adherence of the adhesive tape largely changes depending on the temperature. Thus, the adherence of the adhesive tape used in the lens molding die needs to be considered as adherence under the temperature at which the adhesive tape is subjected.

When observing the behavior of the volume caused by the polymerization shrinkage in the temperature-rising step during the monomer polymerization, it is found that, during the polymerization reaction of the monomer, there is a temperature zone in which the volume rapidly decreases. Such temperature zone appears while the temperature gradually raises and the monomer is being gelled and solidified. For example, in the curing step, in the case where the temperature is raised as the graph shown in FIG. 10, when the volume is being rapidly reduced in the temperature zone denoted by "T" during heating-up period, the center value of the temperature zone T is defined as a "polymerization shrinkage temperature".

The polymerization shrinkage temperature differs depending on the type of the monomer (which is the material of the lens) and the additive; however, the polymerization shrinkage temperature can be adjusted by adjusting the type and the mixed quantity of the reaction initiator and the polymerization catalyst to be mixed into the material monomer. The polymerization shrinkage temperature is adjusted to a temperature so as to be manageable at the producing steps; and it is preferred that the polymerization shrinkage temperature is adjusted to 40° C. to 80° C. It is preferred that a tape whose adhesive power at the polymerization shrinkage temperature is lower than at room temperature is used as the adhesive tape.

The adherence of the adhesive tape is measured under the aforesaid polymerization shrinkage temperature by a method in conformity with JIS Z0237, which is to be described later, and it is preferred that the holding force is between 5 minutes and 30 minutes. It is more preferred that the holding force is between 10 minutes and 20 minutes. If the holding force of the adhesive tape is equal to or higher than 5 minutes, the first molding die and the second molding die can be sufficiently fixed, and therefore there will be no concern that the monomer composition might be leaked out and air might be drawn in due to the movement of the first molding die and the second molding die and/or the peeling-off of the adhesive tape during the period from the pouring of the monomer composition and before the polymerization shrinkage of the monomer composition. If the holding force of the adhesive tape is equal to or lower than 30 minutes, the adherence of the adhesive tape will sufficiently decrease during the polymerization shrinkage, and the movement of the first molding die and the second molding die caused by the polymerization shrinkage will become easy, so that there will be no concern that the adhesive tape might be deformed.

The aforesaid measuring method of the adherence of the adhesive tape in conformity with JIS Z0237 will be described below.

First, an adhesive tape having a width of 25 mm is prepared as a test piece. The adhesive tape having a width of 25 mm is attached to a test plate for a length of 10 mm. A mirrored steel plate made of SUS304 is used as the test plate. After the test plate and the adhesive tape are kept in such a state for 20 minutes, the test plate and the adhesive tape are held in a state where the test plate and the adhesive tape are vertically hung. Further, a weight of 1 kg is hung on an end of the adhesive tape. The elapsed time is measured until the adhesive tape falls from the test plate, and the measured time is regarded as the holding force of the adhesive tape.

Next, experimental examples of the progressive-addition plastic lens having a prism thinning applied thereto produced by the production method of the present invention will be described below.

Experimental Example 1

First, a lens molding die was produced. A molding die for progressive-addition plastic lens was used as a first molding die (a molding die for forming the convex surface) having a molding face formed as a progressive-addition surface, wherein the first molding die constitutes a lens molding die, and wherein the data of the molding die for progressive-addition plastic lens is: outer diameter is 76.0 mm, edge thickness is 4 mm, distance average curvature radius is 122 mm, center thickness is 5.0 mm, effective diameter of the reference surface (also referred to as a "flat flange") in horizontal direction is 75.5 mm. Further, a molding die for progressive-addition plastic lens was used as a second molding die (a molding die for forming the concave surface) having a molding face formed as a spherical surface, wherein the second molding die constituted the lens molding die, and wherein the data of the molding die for progressive-addition plastic lens was: outer diameter was 76.0 mm, curvature radius was 121 mm, center thickness was 2.5 mm. Further, an adhesive tape (base material: polyester film, adhesive agent: silicone-based adhesive agent, tape thickness: 0.068 mm, adhesive power: 5.3 N/10 mm (23° C.)) was wrapped around the circumferential surface of the circumferential surface and the circumferential surface of the second molding die using an automatic mold taping machine (TPM-2000, manufactured by Sambo tech Co. Ltd.) after positioning the first molding die and the second molding die so that the reference axis of the first molding die was inclined upward by 3 degrees in the vertical direction with respect to the reference axis of the second molding die, and so that the position of the geometrical center the outline of the first molding die was located in the reference axis of the second molding die when viewed from the direction of the reference axis of the second molding die. Incidentally, since the circumferential surface of the first molding die and the circumferential surface of the second molding die are configured by cylindrical surfaces of the same diameter respectively parallel to the reference axes of the respective molding dies, the circumferential surface of the first molding die is inclined by 3 degrees with respect to the circumferential surface of the second molding die.

Next, a monomer composition was prepared as the lens material.

First, a 5-liter separable flask equipped with a stirring device was cooled to 5° C. by water bath.

Further, 1426 g of 1,3-methyl diisocyanate-cyclohexane cooled to 5° C. was measured off into a 1-liter polyethylene beaker, to which a 3.0 g of 2-(2'-hydroxy-5'-t-octylphenyl) benzotriazole (Seesorb 709, manufactured by Shipro Kasei Co., Ltd) was added as an ultraviolet absorber, 4.8 g of butoxyethyl acid phosphate (JP-506H, Johoku Chemical Co., Ltd) was added as a mold release agent, and 24.5 g of dimethyltin chloride was added as a polymerization catalyst, and then the mixture was stirred for 20 minutes. By stirring the mixture, the ultraviolet absorber, the mold release agent and the polymerization catalyst were dissolved into the 1,3-methyl diisocyanate-cyclohexane to obtain a homogeneous solution.

Next, the solution of the 1,3-methyl diisocyanate-cyclohexane was transferred to a separable flask. Further, 794 g of pentaerythritol tetrakis(2-mercaptoacetate) cooled to 5° C. and 780 g of 2,5-dimercaptomethyl-1,4-dithiane were added into the separable flask, and the mixture is stirred for 10 minutes.

After stirring was stopped, the separable flask was connected to a vacuum pump to be subjected to vacuum defoaming. In the vacuum defoaming, stirring was restarted while confirming the foaming state of the monomer composition in the separable flask, and stirring speed was gradually increased to a point at which the solution becomes stable at a pressure reduction degree of 40 Pa. Such state was kept for 30 minutes, and then the pressure was returned to ordinary pressure, and thereby that preparation of the monomer composition was completed.

Next, immediately after the monomer composition was prepared, the separable flask was connected to an infusion line configured by a silicone tube having a 5 micrometers thick Teflon (registered trademark) media disk filter attached to just before the nozzle thereof. Further, a part of the adhesive tape of the lens molding die was peeled off so that an inlet was formed, and a roller pump was used to pour the prepared monomer composition into the lens molding die from the inlet while increasing the pressure to 0.3 kgf by dry nitrogen gas. The pouring of the monomer composition was stopped as the monomer composition had filled the cavity of the lens molding die and reached the inlet, and the adhesive tape was wrapped again to seal the lens molding die.

By the aforesaid steps, the lens molding die with the monomer composition poured therein had been completed.

Next, the lens molding die was put into a circulating hot air polymerization oven and kept at 16° C. for 5 hours, and then the temperature was raised to 125° C. over 3 hours and kept at that temperature for 1.5 hours. Thereafter, the lens molding die was cooled to 70° C. and taken out from the polymerization oven, and then the adhesive tape, the first molding die and the second molding die were removed to obtain a progressive lens, which was a finished lens having no prism thinning applied thereto.

The produced progressive lens was a clear and colorless lens whose physical property was: refractive index ne is 1.60, Abbe number ve is 41, specific gravity is 1.32. Such progressive lens showed no abnormality such as striae, foreign substance, dirt, cloudiness and the like, and was suitable to be used as a spectacle lens.

The holding force of the adhesive tape used in the casting mold will be described below. First, in order to measure the polymerization shrinkage temperature of the monomer composition used in the aforesaid polymerization step, 30 ml of such monomer composition was put into a measuring cylinder, and then the measuring cylinder was put into the same circulating hot air polymerization oven as used for heating the lens molding die to observe the change of the liquid level until the polymerization was completed. As the result of the observation, it was known that the polymerization shrinkage temperature of the monomer composition was 70° C.

Next, the holding force of the adhesive tape under the polymerization shrinkage temperature 70° C. was measured by the method for measuring the adherence in conformity with JIS Z0237. As the result of the measurement, it was known that the holding force of the adhesive tape used in experimental example 1 under the polymerization shrinkage temperature 70° C. was 14 minutes.

Experimental Example 2

In experimental example 2, a progressive-addition plastic lens was produced by a method identical to experimental example 1 except that the adhesive tape was different (base material: polyester film, adhesive agent: silicone-based adhesive agent, tape thickness: 0.069 mm, adhesive power: 5.8 N/10 mm (23° C.)).

the experimental examples 1 to 3 produced using the same first molding die and the second molding die and the prismatic power in the vertical direction of the lens of the experimental example 4 were obtained. Further, the minimum values and the maximum values of the prismatic powers in the vertical direction, the minimum values and the maximum values of the differences between the prismatic powers in the vertical direction and the prismatic power in the vertical direction of the experimental example 4, the differences between the respective minimum values and maximum values (i.e., the tolerances), the average values of the prismatic powers in the vertical direction, and the average values of the differences between the prismatic powers in the vertical direction and the prismatic power in the vertical direction of experimental example 4 were obtained. The measurement results are shown in table 1.

TABLE 1

|  | Experimental example 1 | | Experimental example 2 | | Experimental example 3 | | Comparison 1 |
| --- | --- | --- | --- | --- | --- | --- | --- |
|  | Prism in vertical direction [Δ] | Difference from comparison 1 | Prism in vertical direction [Δ] | Difference from comparison 1 | Prism in vertical direction [Δ] | Difference from comparison 1 | Prism in vertical direction [Δ] |
| Maximum value | 4.09 | 3.02 | 4.13 | 3.06 | 4.22 | 3.18 | 1.07 |
| Minimum value | 3.85 | 2.94 | 3.84 | 2.94 | 3.64 | 2.73 | 0.84 |
| Tolerance | 0.24 | 0.13 | 0.29 | 0.12 | 0.58 | 0.45 | 0.23 |
| Average | 3.97 | 3.00 | 3.98 | 3.01 | 3.94 | 2.97 | 0.97 |

The holding force of the adhesive tape used in experimental example 2 under the polymerization shrinkage temperature 70° C. was 11 minutes.

Experimental Example 3

In experimental example 3, a progressive-addition plastic lens was produced by a method identical to experimental example 1 except that the adhesive tape was different (base material: polyester film, adhesive agent: silicone-based adhesive agent, tape thickness: 0.069 mm, adhesive power: 4.8 N/10 mm (23° C.)).

The holding force of the adhesive tape used in experimental example 3 under the polymerization shrinkage temperature 70° C. was 32 minutes.

Experimental Example 4

In experimental example 4, a progressive-addition plastic lens was produced by a method identical to experimental example 1 except that, in the production of the casting mold, positioning was performed so that the reference axis of the first molding die and the reference axis of the second molding die were located in the same axis. The lens of experimental example 4 was a progressive-addition plastic lens having no prism thinning applied thereto, and was used as a reference lens for evaluating the optical performance of the lenses of experimental examples 1 to 3.

(Evaluation)

Thirty pieces of progressive lenses were produced using thirty pairs of the first molding die and the second molding die respectively by the aforesaid experimental examples 1 to 4, and the prismatic power in the vertical direction at the prism measuring position was measured for each produced progressive lens by a lens meter. The differences between the prismatic powers in the vertical direction of each of the lenses of As shown in table 1, in experimental examples 1 and 2, in which the holding force of the adhesive tape was between 5 minutes and 30 minutes, since the movement of the first molding die and the second molding die in the polymerization step was stable, the prism thinning applied when forming the lens molding die was transcribed to the progressive-addition plastic lens with good reproducibility and less tolerance. In contrast, in experimental example 3, in which the holding force of the adhesive tape was 32 minutes, the reproducibility was poor and the tolerance was large compared with experimental examples 1 and 2.

Thus, it is preferred that the holding force in conformity with JIS Z0237 is controlled to a range between 5 minutes and 30 minutes. This is because when the holding force of the adhesive tape is controlled to that range, the adherence of the adhesive tape will sufficiently decrease when being hot-cured, and the movement of the first molding die and the second molding die caused by the polymerization shrinkage will be stable, so that it is possible to produce the progressive-addition plastic lens with high accuracy.

Incidentally, even when the holding force of the adhesive tape was not in the range between 5 minutes and 30 minutes, it was possible to produce the progressive lens with allowable accuracy in the case where the adhesive tape did not deform, although the reproducibility was poor in such case. Thus, it is possible to produce the progressive-addition plastic lens even when the holding force of the adhesive tape is less than 5 minutes or larger than 30 minutes.

It should be understood that the present invention is not limited to the arrangement described in the aforesaid embodiment, but includes various modifications and variations without departing from the spirit of the present invention. For example, although described in the present embodiment is a case where a finished lens is formed, the present invention may also be applied to a case where a lens blank is formed, wherein the lens blank is provided with minimal polishing margin and cutting margin based on the shape of edged lens. Further, although described in the present embodiment is a case where the lens to be formed is a single-surface progressive-addition lens whose lens front surface is a progressive-addition surface, the present invention may also be applied to a case where the lens to be formed is a single-surface progressive-addition lens whose lens back surface is a progressive-addition surface. In such a case, the first molding die is the molding die for forming the lens back surface, and the second molding die is the molding die for forming the lens front surface.

Further, in the aforesaid embodiment, the inclination angle setting sections 115A, 115B of the molding die holding device 110 are respectively arranged on the outward side of the rotation axis B of the both molding dies 21, 22, and the non-molding faces of the molding dies 21, 22 are brought into contact with the inclination angle setting ends of the inclination angle setting tools 116A, 116B so as to set the inclination angle of the molding dies 21, 22; however, a cylindrical inclination angle setting section having an inclination angle setting end arranged on each end thereof may be configured. In such a case, in the molding die holding step, such inclination angle setting section is arranged between the both molding dies 21, 22 in a state where the central axis of the inclination angle setting section is aligned with the rotation axis B, and the inclination angle setting ends are brought into contact with the molding faces 21A, 22A of the molding dies 21, 22 so as to set the inclination angle of the molding dies. In such a case, it is preferred that the inclination angle setting section is configured so that the portion having the inclination angle setting end on one side and the portion having the inclination angle setting end on the other side can be separated from each other, and the both portions can be connected so that the combination and the rotational position of the both portions can be changed.

EXPLANATION OF REFERENCE NUMERALS 10, 20 lens molding die
11, 21 front surface (convex surface) molding die (first molding die)
11A, 21A front surface (convex surface) molding face (first molding face)
11B, 21B circumferential surface formed in the edge of the first molding face (first circumferential surface)
12, 22 back surface (concave surface) molding die (second molding die)
12A, 22A back surface (concave surface) molding face (first molding face)
11B, 21B circumferential surface formed in the edge of the second molding face (second circumferential surface)
13, 23 adhesive tape
14, 24 cavity
25 reference surface
30 progressive-addition plastic lens
30A lens front surface
30B lens back surface
30C circumferential surface
31 dotted line
50 lens molding die forming system
51 communication medium
60 spectacles store
61 order terminal
62 frame shape measuring device
80 factory
90 factory server
91 processor
92 storage
100 lens molding die forming device
110 molding die holding device
111A first molding die holding section
111B second molding die holding section
112A first aspiration tube
112B second aspiration tube
113A first absorbent pad
113B second absorbent pad
114A first joint
114B second joint
115A first inclination angle setting section
115B second inclination angle setting section
116A first inclination angle setting tool
116B second inclination angle setting tool
117A first fixing member
117B second fixing member
120 holding position setting device
130 adhesive tape wrapping device
140 controlling device
911 order processing
912 design data creating
913 processing data creating
921 accepting order data
922 design data
923 processing data
924 lens information
925 frame information
926 molding die information
927 inclination angle setting tool information
$A_1, A_2$ reference axis
B rotation axis
$D_{te}, D_{be}$ edge thickness
$D_{t1}, D_{t2}$ edge thickness of upper end
$D_b$ edge thickness of lower end
H horizontal cross section
$N_L$ normal line
$P_1$ prism measuring position
$P_m$ first molding face reference point
$R_1, R_2$ reference surface
S shape of edged lens
$T_t$ uppermost tangent
$T_b$ lowermost tangent
V vertical cross section

The invention claimed is:
1. A method for producing a progressive-addition spectacle lens having a prism thinning applied thereto comprising:
a lens molding die forming step of forming a lens molding die configured by a first molding die having a molding face for forming one optical surface, which is a progressive-addition surface, of the lens and a second molding die having a molding face for forming the other optical surface of the lens, wherein the first molding die and the second molding die are arranged so that the respective molding faces thereof face inner side, wherein a reference axis of the first molding die is a central axis of a circumferential surface of the first molding die, and a reference axis of the second molding die is a central axis of a circumferential surface of the second molding die, and wherein the second molding die is formed so that the reference axis thereof is aligned with a normal line of the molding face of the second molding die at a point where the reference axis of the second molding die intersects with the second molding die;
a filling step of filling a lens material liquid containing a monomer composition into the formed lens molding die; and a curing step of polymerizing and curing the filled lens material liquid so as to form the lens, wherein the molding face of the first molding die is formed so that a normal line at a point where the molding face of the first molding die intersects with the reference axis of the first molding die is inclined in the vertical direction with respect to the reference axis of the first molding die, and wherein the lens molding die forming step comprises:
- a molding die holding step of holding the both molding die so that the reference axis of the first molding die is inclined in the vertical direction with respect to the reference axis of the second molding die;
- a molding face inclination angle calculating step of calculating a molding face inclination angle in the vertical direction between the both optical surfaces, the molding face inclination angle being formed for reducing the edge thickness of the lens shape after edging, wherein the molding face inclination angle is equal to the angle between the normal line of the molding face of the first molding die and the reference axis of the second molding die;
- a molding die inclination angle calculating step of calculating a molding die inclination angle of the first molding die with respect to the second molding die in the molding die holding step based on the difference between the molding face inclination angle obtained in the molding face inclination angle calculating step and the angle between the normal line of the first molding die and the reference axis of the first molding die; and
- an adhesive tape wrapping step of wrapping an adhesive tape around circumferential surfaces of the both molding dies held in the molding die holding step with the adhesive face of the adhesive tape facing the circumferential surfaces of the both molding dies, and wherein the molding die holding step inclines the first molding die with respect to the second molding die according to the molding die inclination angle obtained in the molding die inclination angle calculating step and holds the molding dies.

2. The method for producing the progressive-addition spectacle lens according to claim 1, wherein the circumferential surfaces of the both molding dies are cylindrical surfaces respectively substantially parallel to the reference axes of the respective molding dies, and the adhesive tape wrapping step stretches the adhesive tape and attaches the adhesive face of the adhesive tape to the circumferential surfaces of the both molding dies.

3. The method for producing the progressive-addition spectacle lens according to claim 2, wherein the adhesive tape wrapping step wraps the adhesive tape with the reference axis of either molding die as a rotation axis.

4. The method for producing the progressive-addition spectacle lens according to claim 1, wherein in the molding die holding step, the second molding die is held so that the rotational position with the reference axis thereof as the center is adjustable and the position of the second molding die along the direction of the reference axis thereof is adjustable, and the first molding die is held so that the inclination angle of the reference axis thereof in the vertical direction is adjustable.

5. The method for producing the progressive-addition spectacle lens according to claim 1, wherein the holding force of the adhesive tape is set so that during the polymerization and cure in the curing step, the adhesive face of the adhesive tape peels off from the circumferential surface of at least one of the both lens molding dies.

6. The method for producing the progressive-addition spectacle lens according to claim 5, wherein the holding force of the adhesive tape is in a range of 5 to 30 minutes.

* * * * *